(12) United States Patent
Ayyagari et al.

(10) Patent No.: US 7,848,306 B2
(45) Date of Patent: Dec. 7, 2010

(54) COEXISTENCE OF ACCESS PROVIDER AND IN-HOME NETWORKS

(75) Inventors: Deepak V. Ayyagari, Vancouver, WA (US); Wai-Chung Chan, Vancouver, WA (US); Lawrence W. Yonge, III, Ocala, FL (US)

(73) Assignee: Sharp Laboratories of America, Inc., Camas, WA (US)

( * ) Notice: Subject to any disclaimer, the term of this patent is extended or adjusted under 35 U.S.C. 154(b) by 882 days.

(21) Appl. No.: 11/420,945

(22) Filed: May 30, 2006

(65) Prior Publication Data

US 2007/0025244 A1 Feb. 1, 2007

Related U.S. Application Data

(60) Provisional application No. 60/703,223, filed on Jul. 27, 2005.

(51) Int. Cl.
*H04J 3/00* (2006.01)
(52) U.S. Cl. ........................................ 370/345
(58) Field of Classification Search ............ None
See application file for complete search history.

(56) References Cited

U.S. PATENT DOCUMENTS

| | | | |
|---|---|---|---|
| 4,977,593 A | 12/1990 | Ballance | |
| 5,142,578 A | 8/1992 | Matyas et al. | |
| 5,185,796 A | 2/1993 | Wilson | |
| 5,204,903 A | 4/1993 | Okada et al. | |
| 5,887,063 A | 3/1999 | Varadharajan et al. | |
| 5,987,331 A * | 11/1999 | Grube et al. | 455/509 |
| 6,097,817 A | 8/2000 | Bilgic et al. | |
| 6,526,581 B1 | 2/2003 | Edson | |
| 6,559,757 B1 | 5/2003 | Deller et al. | |
| 6,587,453 B1 | 7/2003 | Romans et al. | |
| 6,594,268 B1 | 7/2003 | Aukia et al. | |
| 6,759,946 B2 | 7/2004 | Sahinoglu et al. | |
| 6,775,280 B1 | 8/2004 | Ma et al. | |
| 6,782,476 B1 | 8/2004 | Ishibashi | |
| 6,807,146 B1 | 10/2004 | McFarland | |
| 6,901,064 B2 | 5/2005 | Cain et al. | |
| 7,200,147 B2 | 4/2007 | Shin et al. | |

(Continued)

FOREIGN PATENT DOCUMENTS

EP 0 844 563 B1 1/2003

(Continued)

OTHER PUBLICATIONS

David Ruiz et al., "In-Home AV PLC MAC with Neighboring Networks Support," IEEE, 2005, p. 17, rt. hand column, line 14-p. 20,rt. hand column, line 16; and Figs. 2,3,& 6.

(Continued)

*Primary Examiner*—Raj K Jain
(74) *Attorney, Agent, or Firm*—Michael Blaine Brooks, P.C.; Michael B. Brooks; David Ripma

(57) ABSTRACT

Embodiments of the invention provide methods, systems, and devices that coordinate access to a common medium between two networks. Typically, a gateway is employed that requests resources from a home central coordinator and/or access coordinator. If resources are not available from the home central coordinator and the access coordinator, a neighbor network protocol is performed to obtain additional resources.

14 Claims, 12 Drawing Sheets

U.S. PATENT DOCUMENTS

| | | | |
|---|---|---|---|
| 7,212,513 B2 | 5/2007 | Gassho et | |
| 7,242,932 B2 | 7/2007 | Wheeler et al. | |
| 7,330,457 B2 | 2/2008 | Panwar et al. | |
| 7,339,457 B2 | 3/2008 | Trochesset | |
| 7,342,896 B2 | 3/2008 | Ayyagari | |
| 7,356,010 B2 | 4/2008 | He et al. | |
| 7,496,078 B2 | 2/2009 | Rahman | |
| 7,506,042 B2 | 3/2009 | Ayyagari | |
| 2001/0048692 A1 | 12/2001 | Karner | |
| 2002/0116342 A1 | 8/2002 | Hirano et al. | |
| 2002/0150249 A1 | 10/2002 | Ohkita et al. | |
| 2002/0163933 A1 | 11/2002 | Benveniste | |
| 2003/0038710 A1 | 2/2003 | Manis et al. | |
| 2003/0039257 A1 | 2/2003 | Manis et al. | |
| 2003/0051146 A1 | 3/2003 | Ebina et al. | |
| 2003/0056014 A1 | 3/2003 | Verberkt et al. | |
| 2003/0066082 A1 | 4/2003 | Kliger et al. | |
| 2003/0198246 A1 | 10/2003 | Lifshitz et al. | |
| 2003/0203716 A1 | 10/2003 | Takahashi et al. | |
| 2003/0231607 A1 | 12/2003 | Scanlon et al. | |
| 2004/0013135 A1* | 1/2004 | Haddad | 370/493 |
| 2004/0028062 A1* | 2/2004 | Pirhonen et al. | 370/401 |
| 2004/0066783 A1 | 4/2004 | Ayyagari | |
| 2004/0075535 A1 | 4/2004 | Propp et al. | |
| 2004/0165728 A1 | 8/2004 | Crane et al. | |
| 2004/0174829 A1 | 9/2004 | Ayyagari | |
| 2004/0214570 A1 | 10/2004 | Zhang et al. | |
| 2005/0015805 A1 | 1/2005 | Iwamura | |
| 2005/0033960 A1 | 2/2005 | Vialen et al. | |
| 2005/0041673 A1* | 2/2005 | Jiang et al. | 370/401 |
| 2005/0149757 A1 | 7/2005 | Corbett et al. | |
| 2005/0169222 A1* | 8/2005 | Ayyagari et al. | 370/338 |
| 2005/0170835 A1 | 8/2005 | Ayyagari et al. | |
| 2005/0174950 A1 | 8/2005 | Ayyagari | |
| 2005/0193116 A1 | 9/2005 | Ayyagari et al. | |
| 2006/0007907 A1 | 1/2006 | Shao et al. | |
| 2006/0031477 A1 | 2/2006 | Ayyagari | |

FOREIGN PATENT DOCUMENTS

| | | |
|---|---|---|
| EP | 1 693 998 A1 | 8/2006 |
| WO | WO 03/015291 A2 | 2/2003 |
| WO | WO 03/026224 A1 | 3/2003 |
| WO | WO 2005/062546 A1 | 7/2005 |

OTHER PUBLICATIONS

Ayyagari, Deepak,"High Speed Home Networking for AV and IP Applications using existing Powerline Infrastructure," Dec. 2004,p. 65-72,paras:[0001]&[0004],Sharp Technical Journal.

Schneier, Bruce, "Applied Cryptography,"1996, John Wiley & Sons, Inc., Second Edition, pp. 34-38, pp. 48-49, pp. 513-514, and pp. 518-520.

Non-Final Office action for U.S. Appl. No. 11/420,432, dated Apr. 28, 2009.

Final Office action for U.S. Appl. No. 11/420,432, dated Nov. 23, 2009.

Non-Final Office action for U.S. Appl. No. 11/420,432, dated Mar. 25, 2010.

Advisory Action for U.S. Appl. No. 11/388,584 dated Mar. 22, 2010.

Final Office action for U.S. Appl. No. 11/388,584 dated Jan. 7, 2009.

Final Office action for U.S. Appl. No. 11/388,584 dated Jan. 13, 2010.

Non-Final Office action for U.S. Appl. No. 11/388,584, dated Jun. 25, 2009.

Non-Final Office action for U.S. Appl. No. 11/388,584, dated Oct. 6, 2008.

Final Office action for U.S. Appl. No. 11/388,869 dated Jan. 14, 2010.

Non-Final Office action for U.S. Appl. No. 11/388,869 dated Jun. 10, 2009.

Non-Final Office action for U.S. Appl. No. 11/388,869 dated Jul. 7, 2010.

Non-Final Office action for U.S. Appl. No. 11/421,155 dated Mar. 2, 2010.

Final Office action for U.S. Appl. No. 11/421,155 dated Aug. 12, 2009.

Non-Final Office action for U.S. Appl. No. 11/421,155 dated Feb. 23, 2009.

Notice of Pre-Appeal Brief for U.S. Appl. No. 11/388,584 dated Jun. 16, 2010.

Final Office action for U.S. Appl. No. 11/420,432 mailed Aug. 31, 2010.

Notice of Allowance for U.S. Appl. No. 12/728,040 dated Aug. 23, 2010.

Notice of Allowance for U.S. Appl. No. 11/421,155 dated Aug. 5, 2010.

* cited by examiner

COEXISTENCE OF ACCESS PROVIDER AND IN-HOME NETWORKS

CROSS-REFERENCE TO RELATED APPLICATIONS

This application claims the benefit of U.S. Provisional patent Application Ser. No. 60/703,223 filed Jul. 27, 2005, entitled "Coexistence of Access Provider and In-Home Networks," which is hereby incorporated by reference herein in its entirety including all appendixes for all purposes.

This application is related to the following pending applications with the following Ser. No. 11/089,792 entitled "Systems and Methods for Network Coordination with Limited Explicit Message Exchange," Ser. No. 11/089,756 entitled "Method for Transitioning between Coordination Modes for Interfering Neighbor Networks," and Ser. No. 11/089,882 entitled "Methods and Systems for Network Coordination." These pending applications are herein fully incorporated by reference.

FIELD OF THE INVENTION

The present invention is related to coordinating access to a common medium between two networks, particularly, between two power line communication (PLC) networks.

BACKGROUND

Access providers, such as those companies that provide access to the Internet or World Wide Web, seek data and communication channels, such as power line channels to deliver content into homes. At the same time, home or personal local networking is emerging as an independent and stand-alone market where the in-home network is owned, deployed, and operated by the home dweller.

In the case of networks using transmission channels such as power lines, the access network is typically operated by the access/service provider, and the in-home network is operated by the end consumer. Considering that these two networks transmit on a common medium, these networks interfere with each other and compete for bandwidth resources. This coexistence problem may be addressed presently in one of two ways: (a) Use of filters to isolate the access network from the in-home network, i.e., typically for interference reduction and provide for a sharing of the channel capacity; and (b) Dividing the total available frequency spectrum into orthogonal components for the access and in-home networks. Filters require additional costs and often involve user installation/management responsibilities. Frequency spectrum division typically has some of the spectrum left unused when only the Access or In-Home network is operating.

SUMMARY

In some embodiments of the invention, a method of sharing resource in a data communication system is provided. The system includes a first centralized network (FCN), a second centralized network (SCN), and a gateway. The FCN includes a first central coordinator (CCO) that manages the activities of the FCN and the gateway. The SCN, on the other hand, includes a second CCO that manages the activities of the SCN and the gateway. The method includes the steps of requesting, by the gateway, resource allocation from the first CCO; determining, by the first CCO, availability of at least one first CCO CFP time slot; if the at least one first CCO CFP time slot is available: allocating to the gateway, by the first CCO, the at least one first CCO CFP time slot; and transmitting by the first CCO allocation information related to the allocated at least one first CCO CFP time slot; and if the at least one first CCO CFP time slot is unavailable: transmitting by the first CCO allocation unavailability information; requesting, by the gateway, resource allocation from the second CCO; and determining, by the second CCO, availability of at least one second CCO CFP time slot. Furthermore, if the at least one second CCO CFP time slot is available, the method includes the steps of allocating to the gateway, by the second CCO, the at least one second CCO CFP time slot; and transmitting by the second CCO allocation information related to the allocated at least one second CCO CFP time slot. On the other hand, if the at least one second CCO CFP time slot is unavailable, the method includes the steps of transmitting, by the second CCO, allocation unavailability information; and performing a neighbor network coordination protocol to obtain additional resource for the gateway. In some embodiments, the FCN is typically an access centralized network (ACN), but may also be a home centralized network (HCN). The SCN is typically an HCN, but may also be an ACN.

In some embodiments of the invention, another method of sharing resource in a data communication system is provided. The system includes a first centralized network (FCN), a second centralized network (SCN), and a gateway. The method includes the steps of requesting, by the gateway, resource allocation from a first CCO, wherein the first CCO controls network activities of the FCN, and the gateway interfaces with both the FCN and the SCN; requesting, by the gateway, resource allocation from a second CCO when the first CCO has unavailable resource, wherein the second CCO controls network activities of the SCN; and performing a network neighbor coordination protocol process between at least the first CCO and the second CCO to obtain resource allocation—when the first CCO has unavailable resource and the second CCO has unavailable resource, and wherein the network neighbor coordination protocol process generates compatible beacon schedule for the first CCO and the second CCO. In some embodiments, the FCN is typically an access centralized network (ACN), but may also be a home centralized network (HCN). The SCN is typically an HCN, but may also be an ACN.

In other embodiments of the invention, a system having a common communication medium is provided. The system includes an access centralized network (ACN) that is operably coupled to a data communication network. The ACN includes an access central coordinator (CCO) that manages network activities of the ACN and a gateway. The system also includes a home centralized network (HCN) that is operably coupled to the gateway. The HCN includes a home CCO that manages network activities of the HCN and the gateway. The system also includes a gateway that is operably coupled to both the access CCO and the home CCO. The gateway is adapted to request resource from the access CCO and request resource from the home CCO. Furthermore, the access CCO and the home CCO are each adapted to perform a neighbor network coordinator protocol to share resources over the common communication medium. Moreover, the access CCO is adapted to schedule transmission at a stayout region time slot of the access CCO, wherein the stayout region time slot has been registered by the access CCO to be allocated to the gateway by the home CCO.

In other embodiments of the invention, a device that is adapted to be operably coupled to a data communication system is provided. The device includes a first central coordinator (CCO) and a second CCO. The device includes an allocation request module, a first CCO interface module, and a second CCO interface module. The allocation request module is adapted to request resource allocation from the first CCO; request resource allocation from the second CCO; receive allocation information from the first CCO and the second CCO; inform the first CCO and the second CCO of the received allocation information; and determine whether to request resource allocation from the second CCO based on the allocation information received from the first CCO. The first CCO and the second CCO are of different CCO types, which include a home CCO and an access CCO. The allocation information includes resource-allocation availability information or resource-allocation unavailability information. The first CCO interface module is operably coupled to the allocation request module, and is adapted to enable the device to communicate with the first CCO. The second CCO interface module is operably coupled to the allocation request module, and is adapted to enable the device to communicate with the second CCO.

In some embodiments of the invention, an access central coordinator (CCO) device is provided. The access CCO is adapted to be operably coupled to a data communication system, which includes the access CCO, a home CCO, and a gateway. The access CCO includes a gateway coordination module and a centralized network management module. The gateway coordination module is adapted to receive a resource allocation request from the gateway; transmit a resource allocation information responsive to the received resource allocation request; allocate the requested resource allocation to the gateway; receive, from the gateway, a resource allocation allocated by the home CCO for the gateway; and schedule one or more transmissions based on at least one of the following: the allocated requested resource allocation and the received resource allocation allocated by the home CCO. The centralized network management module is operably coupled to the gateway coordination module. Furthermore, the centralized management module is adapted to schedule resource allocation for stations controlled by the access CCO, which include the gateway. The resource allocation schedule is contained in one or more beacons.

In some other embodiments of the invention, a home central coordinator (CCO) device is provided that is adapted to be operably coupled to a data communication system. The system includes an access CCO, the home CCO, and a gateway. The home CCO includes a gateway coordination module and a centralized network management module. The gateway coordination module is adapted to receive a resource allocation request from the gateway; transmit a resource allocation information responsive to the received resource allocation request; allocate the requested resource allocation to the gateway; receive, from the gateway, a resource allocation allocated by the access CCO for the gateway; and schedule one or more transmissions based on at least one of the following: the allocated requested resource allocation and the received resource allocation allocated by the access CCO. The centralized network management module is operably coupled to the gateway coordination module, and is adapted to schedule resource allocation for stations controlled by the home CCO, which include the gateway. The resource allocation schedule is contained in one or more beacons.

BRIEF DESCRIPTION OF THE DRAWINGS

The present invention is illustrated by way of example and not limitation in the figures of the accompanying drawings, and in which.

DETAILED DESCRIPTION

Figure 1:
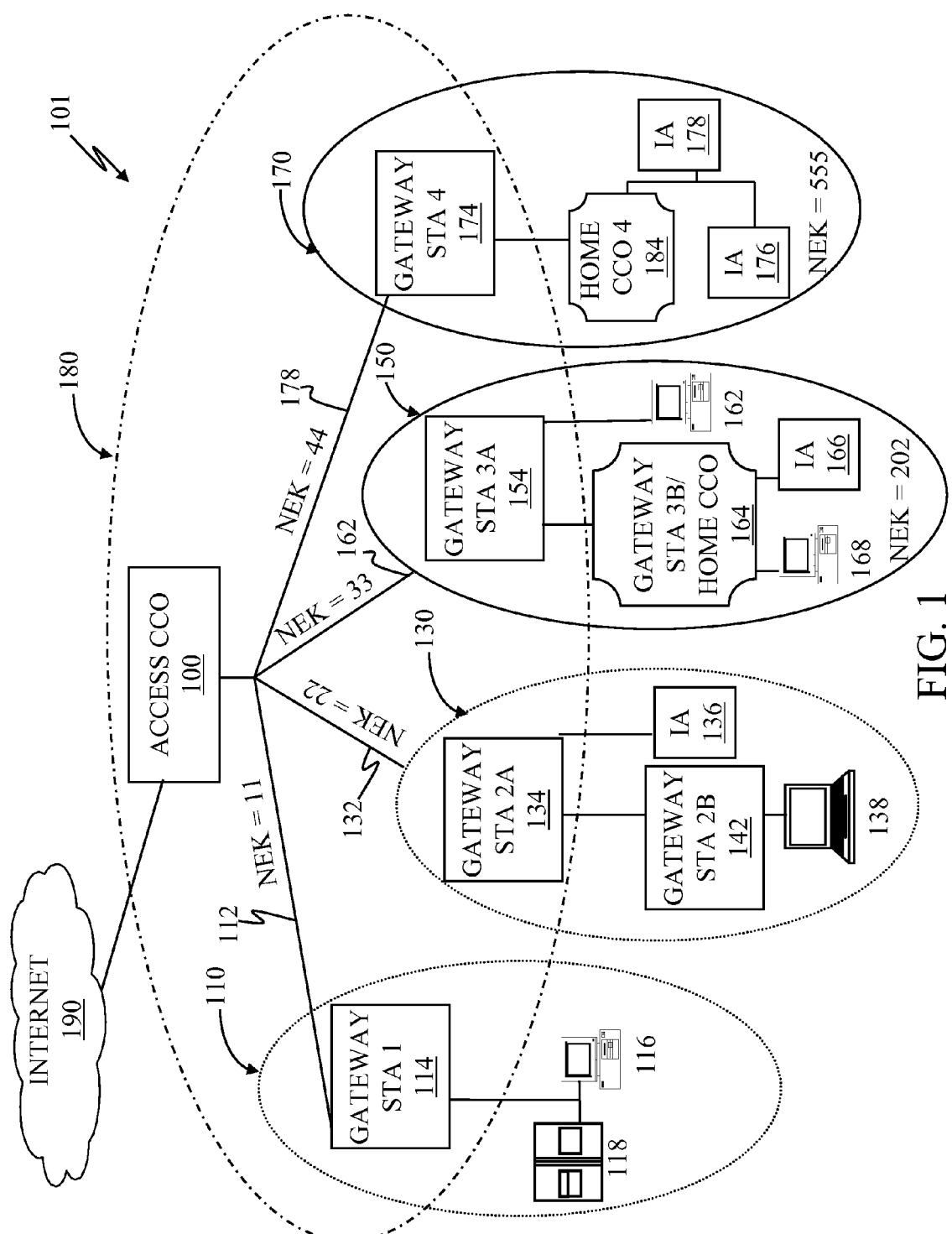
FIG. 1 is a high-level block diagram of an exemplary data communication system according to an embodiment of the invention.
Figure 2:
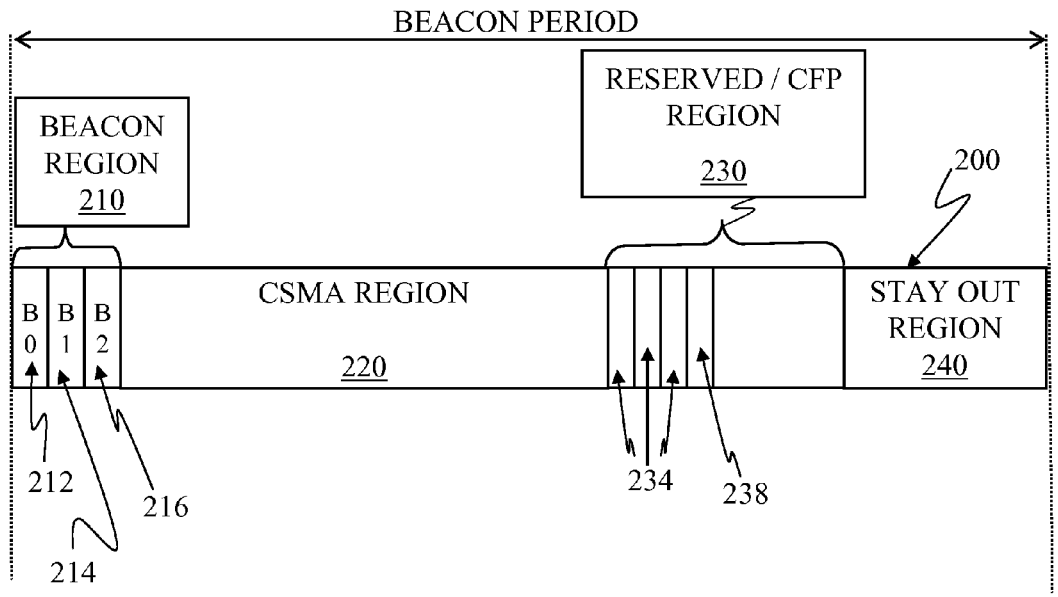
FIG. 2 is a diagram of an exemplary beacon according to according to an embodiment of the invention.

To better understand the figures, reference numerals within the one hundred series, for example, 100 and 114, are initially introduced in FIG. 1, reference numerals in the two hundred series, for example, 210 and 234, are initially introduced in FIG. 2, and so on and so forth. So, reference numerals in the eight hundred series, e.g., 802 and 844, are initially introduced in FIG. 8.

FIG. 1 is an exemplary diagram of a data communication system architecture 101 according to some embodiments of the invention. In some embodiments, the data communication system includes a power line system that has portions of the data communication network segments over power lines. Power line communication (PLC), sometimes also called broadband over power line (BPL), is a wire-based technology—which in particular uses medium and low voltage power lines for data communications. These power line networks include networks created by using electrical wirings, for example, in homes and buildings. Data communicated for example, include, but are not limited to, music, streaming videos, files, voice, databases, text files, control commands, and network keys.

In some embodiments of the invention, the network may use time division multiplexing (TDM) as a method of multiple data streams sharing a signal according to time segments. The data streams may be reconstructed according to their time slots. In general, TDM enables several users/stations to share the same frequency by dividing it into different time slots. The stations typically transmit in rapid succession, one after the other, each using their own defined time slot. Time division multiple access (TDMA) and TDM are techniques known to those of ordinary skill in the art and may be used with PLC technology. The networks of the present invention may also use other time-division multiplexing technologies, and other technologies such as orthogonal frequency-division or combinations and variations thereof.

A "centralized network" (CN) refers herein to a network having a central network coordinator also called the central coordinator (CCO) that controls network activities, such as bandwidth allocation to all devices within the network. For each centralized network, there is typically one instance of a CCO and one or more stations/devices. In some embodiments, however, the CCO may be the only device in the centralized network. Any station or device generally, however, may function as the CCO provided it has the sufficient management functionality. Stations that may be connected to this PLC network 101 include devices such as monitors, TVs, VCRs, DVD players/recorders, other audiovisual devices, computers, game consoles, sound systems, information appliances, smart-home technology appliances, home audio equipment, or any other device that is PLC-enabled or compatible, or is able to communicate via the power lines. Although the embodiments of the invention herein are exemplified and discussed using power line networks, features of the present invention are also relevant to other networks; by way of example and not limitation, such exemplary networks include: networks that have a centralized architecture with a central coordinator controlling the activities of the devices in the network; networks that use a time-scheduling technology, such as TDMA or other time-division technology, or combinations thereof, and wireless networks. Accordingly, the use of power line networks in exemplary configurations is intended to aid in understanding the features of the several embodiments of the present invention.

The embodiments of the present invention provide methods of coordinating and managing two interfering networks, particularly between two networks that interfere with each other and may require the simultaneous use of available frequency and time. In particular, these embodiments address resource coordination between two types of centralized networks—an access centralized network (ACN) and a home centralized network (HCN), and enable these networks to dynamically share their time frames with each other based on network traffic load. For example, a station or device that simultaneously belongs or interfaces with both an ACN—a first centralized network, and a HCN—a second centralized network, may obtain bandwidth from either the ACN or its own HCN, for example, to communicate with the Internet. If neither network has sufficient bandwidth, then neighbor network coordination, for example, between two neighbor centralized networks, may be initiated to increase the reserved bandwidth of the ACN to support that station. In particular, an access CCO may use time for transmission within a subframe that is being used by a HCN upon explicit authorization from the home CCO controlling that HCN.

In some embodiments, a CCO is a station (STA) or device that typically controls the timing and resource, e.g., bandwidth allocation, of all stations within the centralized network. A CCO may also control and schedule its own network activities. The role of the CCO, however, generally may be transferred from one STA to another, if needed or so desired. To keep the centralized network synchronized and to indicate bandwidth allocation, the CCO transmits beacons to maintain the timing of the network. The CCO may also determine which stations in the network may access the channel at a given time. A CCO may also coordinate with other CCOs in interfering neighbor networks to enable neighbor networks to coexist and share the same channel. In some embodiments, there are two types of CCO—a home CCO controlling an HCN and an access CCO controlling an ACN.

An access CCO is a CCO that is generally controlled and owned by the access provider or Internet service provider (ISP) that provides, for example, Internet access to home or business users, e.g., customers. An access CCO is typically, i.e., representatively presented by example as being, operatively coupled to a data communication network, such as the Internet, sometimes referred to as the World Wide Web, or other data communication such as a virtual private network and a wide area network. The access provider thus provides access to this data communication network outside of the home centralized networks via gateway stations. An access CCO also typically transmits a beacon once every beacon period to maintain, for example, the timing, sequence, and load of the ACN. An in-home or home CCO, on the other hand, is a CCO that is controlled and owned by a home user. A home CCO also typically transmits a beacon once every beacon period to maintain and synchronize the HCN. Although called herein as home centralized networks, the embodiments of the present invention apply to local centralized networks, for example, implemented by other end-users such as businesses and schools.

FIG. 1 is an exemplary communication system 101 with three CCOs 100, 164, 184 and therefore three centralized networks. This system 101 includes an access centralized network (ACN) 180 and two home centralized networks (HCNs) 150, 170. The ACN 180 includes the access CCO 100 and the access stations, e.g., the gateway stations—"(GS) 1" 114, "GS 2A" 134, "GS 3A" 154, and "GS 4" 174. Typically, the access CCO interfaces with and controls the gateway stations. Described in another way, in this exemplary embodiment, the ACN controls four access users 110, 130, 150, 170 typically via the four gateways 114, 134, 154, 174. The access CCO 100 is operatively coupled to a data communication network 190, such as the Internet, and thus the access CCO typically provides Internet access to the stations or devices operatively coupled to the gateway stations. In this exemplary embodiment, each user 110, 130, 150, 170, meaning the stations operably coupled to the gateway, is able to access the Internet 190 via the gateways.

A gateway station or gateway (GS) in general is a station that is installed in the access user's vicinity such as the user's home. Although installed in the user's home, for example, a GS is controlled and managed by an access CCO. In some embodiments, a GS may interface with an access CCO and a home CCO. For example, "GS 1" 114 and "GS 2A" 134 interface only with the access CCO 100, while "GS 3A" 154 and "GS 4" 174 interface with both the access CCO 100 and their home CCO 164, 184. In this exemplary embodiment, "GS 3A" 154 is controlled by or interface with both the access CCO 100 and the home CCO 154, while "GS 4" is controlled by both the access CCO 100 and the home CCO 184. In this exemplary embodiment wherein a GS interfaces with both ACN/access CCO and the HCN/home CCO, additional requirements are imposed on the GS because it has to be compatible with both centralized networks—HCN and ACN. In some embodiments, a GS may obtain resource allocation, typically from either the access CCO, the home CCO, or via a neighbor network coordination process/protocol. This resource allocation typically includes determining whether there are available unallocated contention-free period time slots.

In this exemplary embodiment, "GS 1" 114 is operatively coupled to an information appliance (IA) 118 and a computer 116. The two devices may in some embodiments form a local area network that is not controlled by a CCO. "GS 2A" is operatively coupled to an IA 136 and to another gateway station—"GS 2B" 142. "GS 2B" is operatively coupled to a computer 138. The two gateway stations 134, 142 typically coordinate and communicate with each so that the devices coupled to these gateways may obtain the necessary bandwidth to communicate with the Internet 190 via the access CCO 100. "GS 3A" is operatively coupled to a computer 162 and to another gateway, "GS 3B" 164 which also functions as a home CCO. "GS 3B" 164 is operatively coupled to a computer 168 and to an IA 166. "GS 4" 174 is operatively coupled to a home CCO 184, which in turn is operatively coupled to two IAs 176, 178.

One home centralized network (HCN) 150 is controlled by the home CCO 164, while the other HCN 170 is controlled by the home CCO 184. In this embodiment, the access CCO and the home CCOs are within range of, and interfere with, each other. An HCN, for example, may be configured and deployed to deliver audio, data, video, and other types of data within the home. In some embodiments, a presumptive state is relied upon, that is, if two CCOs are able to detect and/or decode each other's beacon transmissions, the two centralized networks interfere with each other, including all their stations. Other criteria of interference, however, may also be used, such as the availability of stations in one CN able to decode transmission from stations of other networks. In this embodiment, the access CCO 100 and the home CCOs 164, 184 are typically operating in the coordinated mode. The home CCO 164 in the HCN 150 thus controls the activities of the devices 162, 166, 168, 154 operably coupled to it. Similarly, the home CCO 184 controls the activities within the HCN 170.

Security Via Encryption:

To provide security within a centralized network and between networks, transmissions, e.g., packets, are encrypted. Moreover, to support multiple users, the access CCO 100 generally supports the use of multiple network encryption keys (NEKs). Typically, the minimum number of NEKs supported by an access CCO is equal to the number of active users within the ACN. Typically, each user has a gateway interfacing to the access CCO. In this exemplary embodiment 101, there are four NEKS 112, 132, 162, 178, one for each user. Each user is also typically assigned its own unique NEK, thereby enabling proper data or messages within the network to be directed to and read by the proper user, using the user's unique NEK, e.g., "GS 1" 114 with NEK="11" and "GS 2A" with NEK="22." In one embodiment, the NEK or indication of what NEK is being used, e.g., index, is contained as part of the packet, e.g., part of frame control.

For purposes of illustration, there are at least two types of cryptography/encryption: secret key or symmetric cryptography and public key or asymmetric cryptography. These types of keys are generally known to those of ordinary skill in the art. There are various encryption algorithms, standards, and architectures currently available. Various cryptographic and encryption techniques are known to those of ordinary skill in the art. The NEKs of the present invention are typically symmetric keys.

Considering that a station may belong or simultaneously interface with an ACN and an HCN, it is typical that the NEKs between these two networks be distinguished. In another embodiment, the range of NEKs or indices to NEKs is divided into two disjoint sets. One set is a range of indices or NEKs that are themselves typically allocated for ACNs and the other set typically allocated for the HCNs. The various NEKs for the ACN are typically assigned by the access CCO, while the NEKs for the HCN are typically assigned by the home CCO. In another embodiment, gateway stations that interface with both the ACN and HCN may have two NEKs—one for the ACN and one for the HCN; alternatively in some embodiments both ACN and HCN are allocated and may use the same NEK.

Indices to NEKs may also be used. For example, if an index is used to determine an NEK, and the index is 8-bits long, indices between "00000001" and "01111111," inclusive, may be reserved for HCNs, while indices between "10000000" and "11111110," inclusive may be reserved for ACNs. In some embodiments, some index values, for example, "00000000" and "11111111," are allocated for special purposes, e.g., to indicate that the NEK to be used is the unique encryption key hardwired or supplied by the manufacturer or that the packet is unencrypted or is plaintext. In another embodiment, the NEK index may be the same for both HCN and ACN but the actual NEK for each network, e.g., 128-bit key, is of a value differing from the other NEKs of the other networks. In another embodiment, instead of providing two disjoint sets, a field, e.g., labeled "Network Number," is added. This "network number" field is typically negotiated between the CCOs of the interfering neighbor ACNs and HCNs. This field indicates whether the packet is for an ACN or HCN. From this field, a station may deduce whether to use an ACN or HCN encryption key to decrypt the packet. Other ways of being able to distinguish ACN or HCN encryption keys may also be used, such as all even numbers allotted to ACNs and all odd numbers to HCNs and those starting with the digit "3, "5, or "9" be assigned to ACN and the rest to HCN.

In FIG. 1, for example, "GS 1" 114 (user 1), "GS 2A" 134 (user 2), "GS 3A" 154 (user 3), and "GS 4" 174 (user 4) are each assigned a different ACN NEK, i.e., "11," "22," "33," and "44," respectively. This enables the access CCO 100 to securely communicate with the proper GS. Using this unique NEK scheme, for example, messages encrypted with NEK="11" may only be read/decrypted by "Access User 1", particularly, by "GS 1" 114, even if the messages were heard by the other gateway stations over the power line channels. The local HCNs, in this example, may also use different NEKs. Thus, stations or devices controlled by the home CCO 164 in the HCN may send and receive messages encrypted with the home NEK with value "202," while the other home CCO may send and receive messages encrypted with the home NEK with the value "555." Using the encryption keys of several embodiments of the present invention, the various networks, the ACNs and HCNs, may have data secured from each other. In some embodiments, a customer may have multiple gateway stations in the customer's home or business, so as to provide security and privacy.

Terminal Equipment Identifier:

To facilitate distinguishing between devices within the HCNs and ACNs, the embodiments of the present invention enables the CCO to assign a terminal equipment identifier (TEI) to each station in the network. Packets sent via the network typically include a source TEI and a destination TEI to indicate the transmitter of the packet and the intended recipient or receiver of the packet. In these examples, the TEI is typically used, rather than the media access control (MAC) address for source and destination identifier, because the TEI is shorter in length thereby reducing overhead processing cost. Similar to the NEKs, the TEIs or TEI indices, are typically divided into two disjoint sets—one identifying ACN stations, another identifying HCN stations. This prevents a STA that belongs to an ACN to be assigned the same TEI as a STA that belongs to an HCN. When a packet is sent to one of these two STAs, the other STA may mistakenly register that it is the intended receiver. Other methods of distinguishing ACN and HCN TEIs may also be implemented, such as having a field indicating that the TEI pertains to the ACN, the HCN, or both. In some embodiments, however, the MAC address or other station identifier is used to identify each device within the network.

Beacons:

In some embodiments, a CCO manages the activities of devices within its network using, for example, beacons. Beacons are typically control messages that identify the frame configuration and the bandwidth (BW) assignments within a time frame to multiple networks and to devices within a given network. Based on the beacons, the devices within a centralized network are able to share BW using the same medium or channel, e.g., power line medium. Beacons are typically broadcasted by each CCO, e.g., as a multi-network broadcast, and are decoded by the stations within the network and, in some embodiments by the CCOs of neighbor networks. Beacons are also typically tagged or identified, such that stations within a network decode and follow the BW allocation and scheduling of its own network beacon and not the beacon of another network. Beacons are also transmitted or broadcasted into the networks, typically periodically—e.g., once every beacon period. They may also be transmitted unencrypted. In an alternative embodiment, beacons or portions thereof are encrypted. In general, a beacon may contain other information, such as, but not limited to, MAC address of the CCO, check sum values, and management and control information.

The stations within the network thus decode its own network beacons, and accordingly perform their functions, such as network transmission, following the beacon period allocations or schedule. In one embodiment, a beacon may also contain other or additional information, such as: a source terminal identifier for identifying the device transmitting the beacon; a beacon slot ID for identifying the beacon slot used by the sender of the beacon; beacon slot usage indicating the beacon slots used in the group; and handover-in-progress flag for indicating whether the functions or some of the functions of the CCO are being transferred to another CCO.

A power line medium may be shared by multiple devices, which may interfere with each other. In some embodiments, each CCO typically maintains an Interfering Network List (INL). In some exemplary embodiments, the CCO of each CN, for example, at network initialization, determines its interfering network list (INL) by decoding all existing beacons. It may also monitor existing beacons to update its INL, if necessary, as existing neighboring networks are shut down and new neighboring networks are established. In some embodiments, each CCO typically maintains an Interfering Network List (INL). The INL of a CCO (or of a centralized network) typically contains the list of networks that coordinate with and interfere with the network controlled by the CCO. In some embodiments, an assumption is made that if two CCOs are able to detect each other's beacon transmissions, the two networks controlled by the two CCOs, including all their stations, interfere with each other. In some embodiments, the CCO of each network, for example at network initialization, determines its INL by decoding all existing beacons. The CCO may also monitor existing beacons to update its INL, if appropriate, as existing neighboring networks are shut down and new neighboring networks are established.

FIG. 2 shows an exemplary beacon structure and schedule of a beacon 200 according to some embodiments of the invention. In some embodiments, a beacon comprises several parts or regions 210, 220, 230, 240. Each region is further typically defined into one or more beacon slots or time slots (e.g., slots 212, 214, 216, 234, and 238). In some embodiments, a beacon comprises four or optionally five regions: a beacon region, a carrier sense multiple access region; a reserved region; a stayout region; and an optional protected region.

Beacon Region:

In some embodiments, a beacon region 210 is the region wherein a CCO is able to transmit its own beacon. The beacon region generally includes a number of beacon or time slots, with the duration of each beacon slot typically sufficient for the transmission of a beacon. In some embodiments, the duration of each beacon slot is equal to the sum of the duration of a beacon PHY protocol data unit (PPDU) and the interframe space. In some embodiments, a beacon region 210 may consist of a maximum number of time or beacon slots, with the maximum number defined within the system. In some embodiments, the size of the beacon region, including the number of time slots, may be adjusted dynamically by the CCO. In some embodiments, each CCO typically transmits a beacon in one of the beacon slots within the beacon region every beacon period. For example, access CCO transmits a beacon for the ACN 180 in beacon time slot B0 212, the home CCO 164 transmits a beacon for the HCN 150 at beacon slot B1 214, while the other home CCO 184 transmits a beacon for the HCN 170 at beacon slot B2 216.

In some embodiments, information or data about the beacon region and/or time slots within the beacon region—for example, the number of beacon slots within the beacon region, the beacon slot ID that the CCO is using to transmit its current beacon protocol data unit, and/or the start and/or end time—are kept by the CCO and/or by the CCO of the other neighbor networks. In typical embodiments, the number of beacon slots in the beacon region is the same for all networks in the coordinated mode.

Carrier Sense Multiple Access (CSMA) Region or Contention Period (CP) Region:

The CSMA region 220 is a region wherein any one or more of many contention access protocols are used to share the medium and to coordinate network traffic. In some embodiments, a CSMA/CA protocol may be used. A network may have one or more CP or CSMA regions, which may be non-contiguous with each other. In one embodiment, the CSMA regions of one network do not overlap with the reserved or contention-free period regions of other networks, particularly those in its INL. Communication, however, between two or more interfering networks may be made during overlapping CSMA regions.

For each network, a "minimum CSMA region" (MinCSMARegion) immediately following the beacon region 210 is typically supported. The minimum CSMA region, together with other CSMA regions, located elsewhere in the beacon period, for example, may be used for the following:

(a) exchange of priority-based user data between STAs using CSMA, e.g., CSMA/CA;
(b) new STAs, including CCOs, to associate with the network;

(c) existing STAs to exchange management messages with the CCO (e.g., to set up a new link);
(d) new CCOs to exchange management messages to establish new neighbor networks; and
(e) existing neighbor coordinators (NCCOs) to exchange management messages with the CCO (e.g., to share bandwidth, or to change the number of beacon slots).

Furthermore, in some embodiments, the allocation of a minimum CSMA region immediately following the beacon region 210 enables the beacon region 210 to increase or decrease in size without requiring a change in the schedule or locations in time within the frame, particularly of contention-free period time slots. Moreover, the minimum CSMA region enables new devices joining the centralized network to know where a CSMA region exists even if they cannot hear other beacons. The new or joining station or device may then transmit network associate request messages, for example, messages requesting that the device be enabled to associate with the centralized network, within this minimum CSMA region or time slots.

Reserved Region or Contention-Free-Period (CFP) Region:

This reserved or CFP region 230 is a period when only stations or devices that have explicit authorization from the CCO are allowed to transmit. A reserved region 230 is a time interval that is typically reserved by a network. The network that has been allocated or has acquired control of the reserved region typically schedules the transmission of its contention-free links here. In addition, the CCO may also schedule CSMA allocations that may be used only by the STAs in that network. For example, time slot 238 in the reserved region 230 has been allocated by the CCO 164 to the computer 168, so that the computer/device may freely transmit at that time slot or interval 238 without interference, conflict, or contention from other stations, e.g., 166, 162, 154 within that HCN 150. Explained in another way, it is particular in that time slot 238 that the computer 168 may freely transmit, while other stations in that network are typically silent. This allocation is typically via beacons, such that when a station decodes its own network beacon, information about which station is designated to transmit within that time slot may also be defined within that beacon. In some embodiments, the CCO sends a message directly to the station informing that station when to transmit and sometimes even listen.

A centralized network may have any number of reserved regions in a beacon period. To be compatible, other networks in its INL specify a stayout region in the same time interval, thereby enabling the device with explicit authorization to freely transmit. In one embodiment, it is possible to have two non-interfering networks specify a reserved region in the same interval.

Stayout Region:

The stayout region 240 is a period within a time frame when all stations assigned a stayout region are instructed by the CCO to remain silent, that is, refrain from transmitting within the stayout region 240. Typically, these devices are also instructed or otherwise adapted to refrain from applying a contention access or contention-free access protocol. A stayout region 240 is assigned to avoid conflicts with a device or the HCN that has been assigned a reserved region in the same time interval. In general, a network specifies a stayout region if one or more of the neighboring networks in its INL have specified a reserved or CFP region or a protected region in the same time interval.

In some embodiments of the invention, information about beacon regions, including the number of time slots, are kept within the system, and typically kept by the CCO in each network. Information about beacon slot allocations in the beacon region, as well as information about the other regions, in one embodiment, may be exchanged between CCOs. Furthermore, in some embodiments, the various types of regions need not be allocated in one contiguous time interval. This means for example, that the various types of regions may interleave each other, e.g., a time frame or beacon period includes a beacon region, followed by a CSMA region, followed by a stayout region, followed by another CSMA region, and then followed by a reserved region. The various regions within a beacon period may also be of varying sizes with a varying number of time slot intervals or durations. In some embodiments, the end time of each region type within a beacon period is stored, for example, in multiples of a defined allocation time unit (e.g., "AllocationTimeUnit"), e.g., 0.32 msec.

Protected Region

In alternative embodiments, a beacon period may include another region type (not shown) called a Protected Region. A network group is typically a collection of one or more centralized networks that have the same system timing, i.e., the beacon periods of these networks align with each other.

When a CCO detects the existence of another group with a different timing and if it optionally decides to coordinate with networks in that group, that CCO typically specifies a protected region in the same interval where the beacon region of the other group is located. Stations in a network typically are not allowed to transmit in a protected region. Group coordination, in some embodiments, is optional. A neighboring group of networks, for example, may have a different beacon period start time.

Neighbor Network Operating Modes—Uncoordinated Mode and Coordinated Mode:

In some embodiments of the invention, a network typically operates in one of the following two modes—an uncoordinated (stand-alone) mode and a coordinated mode. A new CCO typically establishes a new network in the uncoordinated mode if it is unable to detect any beacons. This may happen either because there are no existing neighbor networks in the vicinity of the new CCO or because there are existing networks but the new CCO is not able to detect any of the beacons. In this mode, quality of service (QoS) may still be provided by allocating reserved or contention-free allocations or time slots to applications that may require QoS. In some embodiments, a threshold or conditions have to be satisfied before a CCO may be enabled to determine and/or affirm that one or more beacons are detected, e.g., beacons have to be detected reliably which may include repeated detections, i.e., beacons detected a certain number of times within a certain time period or cycle. Thus, in some embodiments, if beacons are not detected satisfying a certain condition, the new CCO establishes a new network in the uncoordinated mode. A CCO operating in the uncoordinated mode, in some embodiments, generates its own timing and transmits its periodic beacon independently of other networks. A new CCO in the uncoordinated mode typically specifies a beacon region with one beacon slot and a CSMA region for the remaining of the beacon period. In some embodiments, it may optionally establish one or more CFP or reserved regions.

A new CCO typically establishes a network in the coordinated mode if it is able to detect beacons, typically reliable detections, from at least one existing network. The new CCO may acquire the timing of the existing network and join the existing network to form a group. In the coordinated mode, a network may typically share bandwidth with neighboring networks in its INL, such that QoS may be provided within each network by using reserved or CFP regions.

Referring back to FIG. 1, the three centralized networks—ACN 180, HCN 150, and HCN 170—are termed neighbor networks to each other. Typically, the access CCO 100 and the home CCOs 164, 184 operate in the coordinated mode of the neighbor network coordination protocol. In this exemplary communication system 101, the access CCO 101 and the home CCOs 164, 184 interfere with each other, i.e., are able to detect and decode each other's beacons. In some embodiments, the HCN 150 and ACN 180 are the only two networks interfering with each other. In some embodiments, the access CCO 100 and the home CCOs 164, 184, including their corresponding networks, belong to the same timing group, i.e., the ACN and the two HCNs form a group and they all support the same timing sequence.

In the coordinated mode, the regions of the beacon of a network are scheduled to be compatible with the regions of other networks within in its INL. For example, if one network in the group specifies a reserved region, the other networks in its INL specify a stayout region in the same interval. On the other hand, if a network specifies a reserved region and a network in its INL specifies a CSMA region, they are said to be incompatible.

Typically, the CCO determines the INL and the INL allocation. Based on the INL allocation, a compatible schedule is set-up. To determine the INL allocation, a CCO typically decodes the beacons of all the networks in its INL and computes or determines the combined effect of their allocations, i.e., the INL allocation. For example, if one neighbor network in the INL specifies a reserved region and another neighbor specifies a CSMA or stayout region, the resultant INL allocation is a reserved region, because a reserved region "outweighs" both CSMA and stayout regions. In another example, if three networks have three different region types in the same time interval allocation, e.g., reserved region, CSMA region, and stayout region, the determined INL allocation is the reserved region, because the reserved region outweighs both the CSMA and the stayout regions. In general, the INL allocation is assigned the same region type of the network whose region type is highest in an exemplary hierarchy. Table I below in general shows an exemplary hierarchy of the various regions of a beacon period.

TABLE I

Hierarchy of Regions

| Level of Weight (5 = Most Weight, 1 = Least Weight) | Region Type |
|---|---|
| 5 | Beacon Region |
| 4 | Protected Region (generally, present if coordinating between groups) |
| 3 | Reserved or CFP Region |
| 2 | CSMA or CP Region |
| 1 | Stayout Region |

In a typical embodiment, the start and/or end time of each region is also generally maintained or tracked by the various CCOs, so that an appropriate compatible schedule and INL allocation may be determined, particularly when regions are of varying sizes or allocations and/or if there are differences in system timing.

Table II below shows exemplary results of INL allocation based on the hierarchy shown in Table I. In this exemplary table, there are two neighboring networks, Centralized Network 1 and Centralized Network 2, e.g., an ACN and an HCN.

TABLE II

Exemplary INL Allocation

| Region Type of Network 1 | Region Type of Neighbor 2 | INL Allocation of Networks 1 and 2 |
|---|---|---|
| Beacon | Beacon, Protected, Reserved, CSMA or Stayout | Beacon |
| Protected | Beacon | Beacon |
| Protected | Protected, Reserved, CSMA, or Stayout | Protected |
| Reserved | Beacon | Beacon |
| Reserved | Reserved, CSMA, or Stayout | Reserved |
| CSMA | Protected | Protected |
| CSMA | CSMA or Stayout | CSMA |
| Stayout | CSMA | CSMA |
| Stayout | Stayout | Stayout |

Once the INL allocation is determined, the CCO typically complies with the conditions outlined below, so as to be compatible. Initially, the new CCO does not specify any reserved regions. Generally:

i.) If the INL allocation is a beacon region and is the first entry in the beacon period, the new CCO typically specifies a beacon region. However, if it is not the first entry, the new CCO typically specifies a protected region, where the coordination between groups of network is in effect. In some embodiments, there is only one beacon region within a beacon.

ii.) Otherwise, if the INL allocation is a protected region or a reserved region, the new CCO specifies a stayout region.

iii.) Otherwise, the new CCO specifies a CSMA region in all other intervals.

Once a network is established in coordinated mode, the conditions typically used by an existing CCO to set the subsequent region types are as follows:

i.) If the INL allocation is a beacon region and if it is the first entry, the existing CCO specifies a beacon region. However, if it is not the first entry, the existing CCO specifies a protected region, where the coordination between groups of network is in effect.

ii.) If the INL allocation is a protected region or a reserved region, the existing CCO specifies a stayout region.

iii.) If the INL allocation is a CSMA region, the existing CCO specifies a CSMA region.

iv.) If the INL allocation is a stayout region, the existing CCO may specify a CSMA region or a reserved Region.

Table III below shows exemplary interaction between the different regions when the CCOs are in the coordinated mode, but with another neighbor network outside of the group.

TABLE III

| CCO A | CCO B (Hears CCO A Beacons and is in the Same Group/Timing Sequence as CCO A) | CCO C (Hears CCO A but is in a Different Group) |
|---|---|---|
| Beacon | Beacon | Protected |
| Protected | Protected or Stayout | Beacon |
| Reserved/CFP | Stayout | Stayout |
| CSMA/CP | CSMA or Stayout | CSMA or Stayout |

Figure 3:
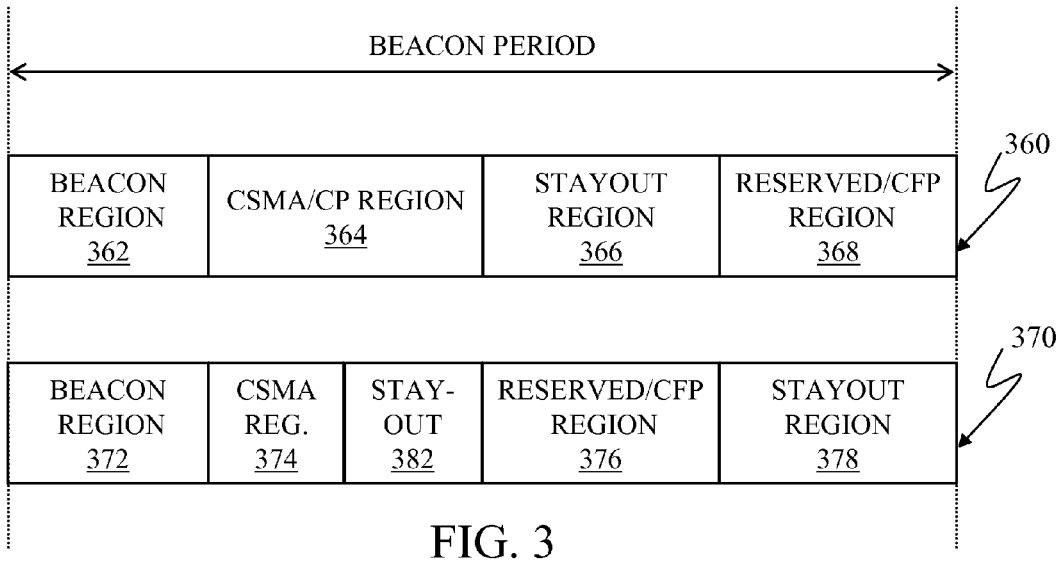
FIG. 3 shows two exemplary beacons with compatible beacon schedules according to embodiments of the invention.

FIG. 3 shows two exemplary beacons 360, 370 for two CCOs, for example, the access CCO 100 and the home CCO 164, respectively, operating in the coordinated mode. Typically, the three CCOs 100, 164, 184 operate in the coordinated mode, hence, their beacons are compatible with each other. FIG. 3, however, only shows exemplary beacons for the access CCO and one of the home CCOs 164.

The top beacon 360 and the bottom beacon 370 show an exemplary BW allocation and scheduling for the ACN 180 and the HCN 150, respectively. To be compatible, when the access CCO 100 schedules its beacon region 362, the neighbor home CCO 164 also schedules its beacon region 372. The other home CCO 184, typically also schedules its beacon region to coincide with the access CCO and the home CCO. Typically, each CCO has its own beacon time slot within the beacon region to transmit its beacon, such that no collision occurs. When the access CCO 100 schedules a CSMA region 364 for channel contention, the home CCO 164 schedules a corresponding CSMA region 374 and a stayout region 382. In some embodiments, the home CCO may schedule an entire stayout region or CSMA region to correspond to the CSMA region 364. When the home CCO 164 schedules a reserved region 376, the access CCO schedules a corresponding stayout region 366 so that the devices allocated reserved time slots 376 during those time intervals are able to typically transmit freely without contention or collision. Similarly, when the access CCO schedules a reserved region 368, the home CCO schedules a stayout region 378 to also guarantee, for example, QoS for the ACN. In some embodiments, a minimum CSMA region (not shown) is allocated immediately following a beacon region for all beacons.

Figure 4:
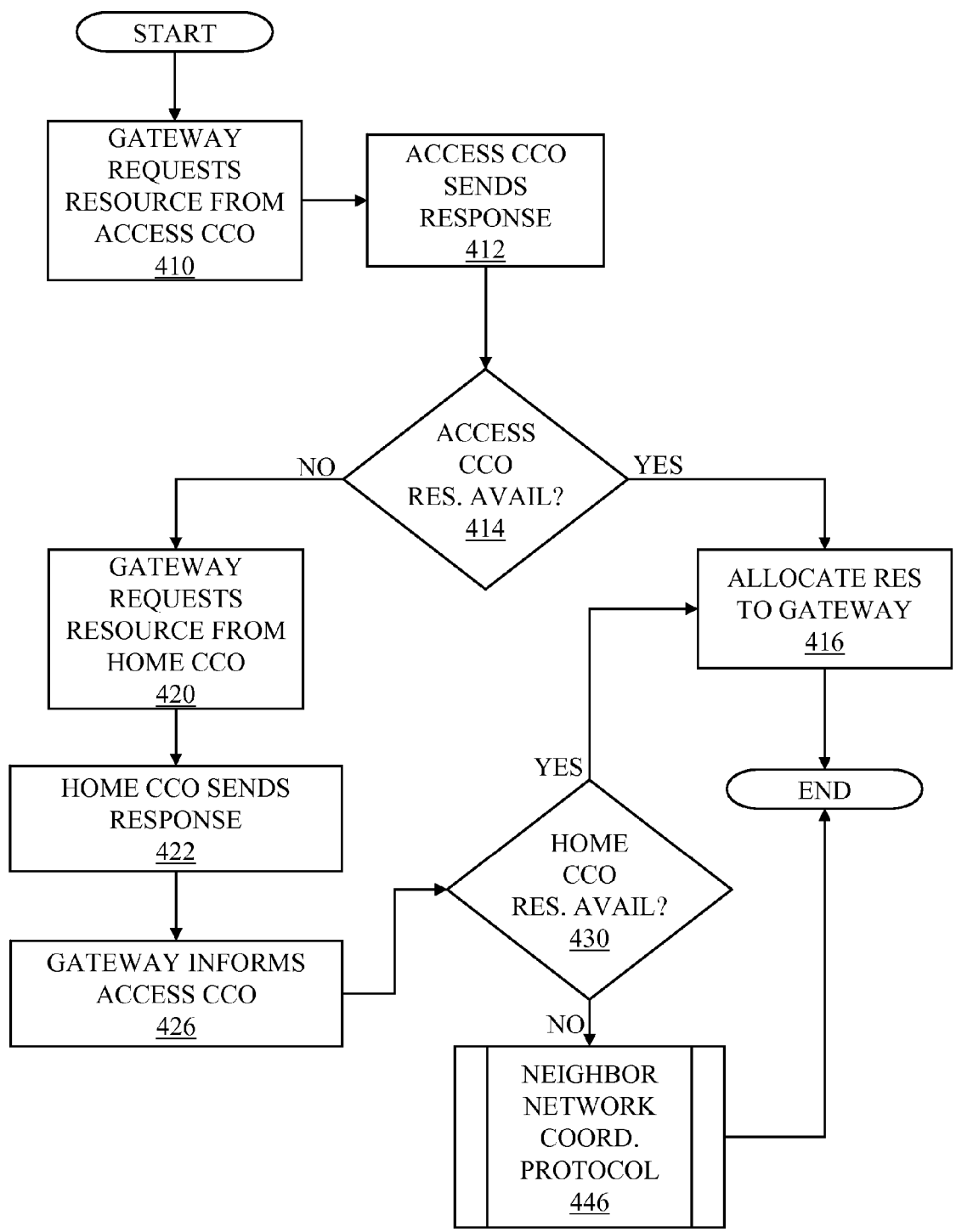
FIG. 4 is a high-level exemplary flowchart showing a process by which a gateway station may obtain additional resource or bandwidth allocation according to an embodiment of the invention.

FIG. 4 is a flowchart of an exemplary high-level process for obtaining resources for a GS 154 that interface with both an ACN/access CCO 100 and an HCN/home CCO 164 operating in the coordinated mode. In some exemplary embodiments, a GS, in order to facilitate communication with an access CCO, is able to associate with the access CCO in an unencrypted mode, supports a high-level application to prove its identity to the access CCO, e.g., through secured hypertext transfer protocol, and/or be able to identify an access station or CCO through its unique MAC address or, in some embodiments, via a terminal equipment identifier (TEI). Furthermore, if a GS belongs to both the ACN and the HCN, the GS may be able to support the use of at least two NEKs, for example, as to those embodiments wherein one encryption key is for communication within the ACN, while the other is for HCN communication. To facilitate communication, the GS may also support the use of two TEIs—one TEI assigned by the home CCO for use in the HCN and the other TEI assigned by the access CCO for use in the ACN. Other device identification scheme, however, may also be used.

In general, there are several possible BW allocation scenarios: a) the resource is obtained from the access CCO, b) the resource is obtained from the home CCO, and c) the resource is obtained using neighbor network coordination. Typically, the process of coordination between a GS and an access CCO first starts with the GS setting-up a logical connection with the access CCO. The GS then typically requests actual physical allocation for the logical connection.

To obtain resources, the GS initially requests a resource allocation be made by the access CCO (step 410). The access CCO checks its resources and accordingly responds back to the GS informing the GS whether the access CCO is able to grant or reject that request (step 412). If the access CCO is able to accommodate the BW allocation request by the GS (decision 414), the GS accordingly allocates the resource to the GS (step 416). If the resource, however, is unavailable from the access CCO (decision 414), the GS then requests resource from the home CCO (step 420). The home CCO then checks its resources and accordingly responds back to the GS informing the GS whether the home CCO is granting or is rejecting that request (step 422). Typically, the GS also informs the access CCO whether the GS was able to obtain resource from the home CCO (step 426). If the resource is available from the home CCO (decision 430), the home CCO accordingly allocates the resource to the GS (step 416). If the resource, however, is unavailable from the home CCO (decision 430), the neighbor network coordination protocol is then initiated to obtain additional bandwidth from neighbor networks (step 446). In some embodiments, the neighbor network coordination protocol is typically initiated by the access CCO, however, in others, the home CCO initiates the network coordination protocol. The access CCO typically negotiates with its neighbor networks, for example, based on its NIL. The network neighborhood coordination protocol generally negotiates a time interval in the CSMA region of the requesting CCO to be modified to become a CFP.

The resource verification/determination step generally involves the CCO determining if it has available CFP unallocated time slot(s). If such time slot(s) are unallocated, for example, currently set to CSMA mode, the time slot(s) are changed such that they are allocated for the GS. This allocation is performed provided by reserving a set of time slots and broadcasting such allocation, e.g., using beacons. One of ordinary skill in the art will recognize that variations in the steps described in the present disclosure may be executed and yet still be within the scope of the invention. For example, it is possible that resources are first requested from the home CCO rather than the access CCO, although this may not be as efficient.

Using Resource from the Access Centralized Network

Figure 5:
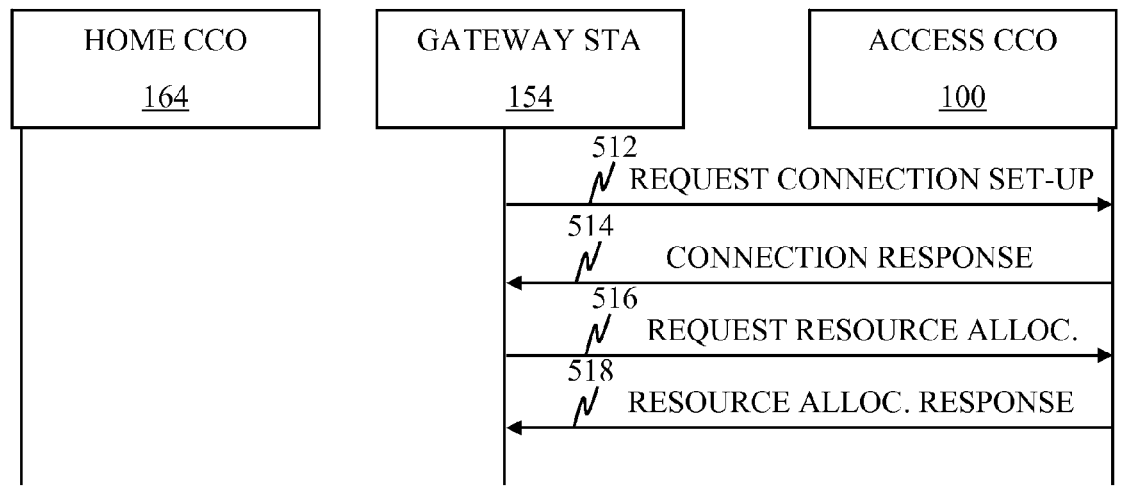
FIG. 5 is an exemplary diagram illustrating messages exchanged between a gateway station and an access CCO when a gateway station requests resources from the access CCO, according to an embodiment of the invention.

FIG. 5 is an exemplary diagram showing an example of a process by which messages are exchanged between a GS 154 and an access CCO 100, indicating that the GS is requesting BW from the access CCO. In general, the GS and the access CCO first exchange messages 512, 514 to set up or add a new connection. A connection set-up request message 512, for example, may include the source and destination addresses of the devices, e.g., the MAC address of the initiating device (source) and the MAC address of the terminating device (destination), and a connection specification (CSPEC). The CSPEC may include the set of parameters that define the characteristics and Quality of Service (QoS) expectations of a connection. The CSPEC may include QOS parameters, such as maximum delay, jitter, and max-min data rates. In some embodiments, the CSPEC may also contain or describe the MAC functions that are applicable to the particular connection, including delay compensation, concatenation, fragmentation, encryption, and the like. In some embodiments, the channel estimation between the access CCO and the GS, for example, may be able to support five bits per symbol between the source and destination devices or other bit loading estimates, and may be also included in the message. In some embodiments, the connection set-up request 512 functions as a request for a logical connection, which then is responded, if granted, with a physical connection. Typically, the access CCO responds back to the GS 154, informing the GS whether the connection has been granted or not 514. Other information, particularly about the resource granted, e.g., time interval and duration may also be included as part of the response.

After a physical connection between the GS and the access CCO is established, the GS 154, then typically requests bandwidth allocation or resource 516 from the access CCO 100. This request 516 is typically for a CFP time interval. This BW allocation request 516 may also include, for example, the CSPEC, forward and/or reverse link bit loading estimates, source and destination addresses. Typically the access CCO checks its resource, particularly to determine whether the access CCO has any unallocated CFP time intervals available. The access CCO then accordingly sends a response back to the GS 518—resource allocation response, informing the GS whether the access CCO 100 is able or not to accommodate that request using its existing share of resource. The resource allocation availability response 518, for example, may include a result code, e.g., a success or fail to grant bandwidth indicator or field. If the result code, for example, is a successful result code, information about the bandwidth allocation/resource, e.g., implemented via global link ID information, is typically included with the response. In some embodiments, actual time allocation may be sent, and may be defined by a start time and an end time, or start time and duration. In some embodiments, the response by the access CCO is a response instructing the GS to obtain allocation from its own HCN. The access CCO also typically modifies its beacon or registers that the time interval previously unallocated is now allocated for the GS. If a failed result code, however, is sent, information such as recommended alternatives to the BW request, e.g., a channel with a lower QOS requirement, may also be included in the response.

Figure 6:
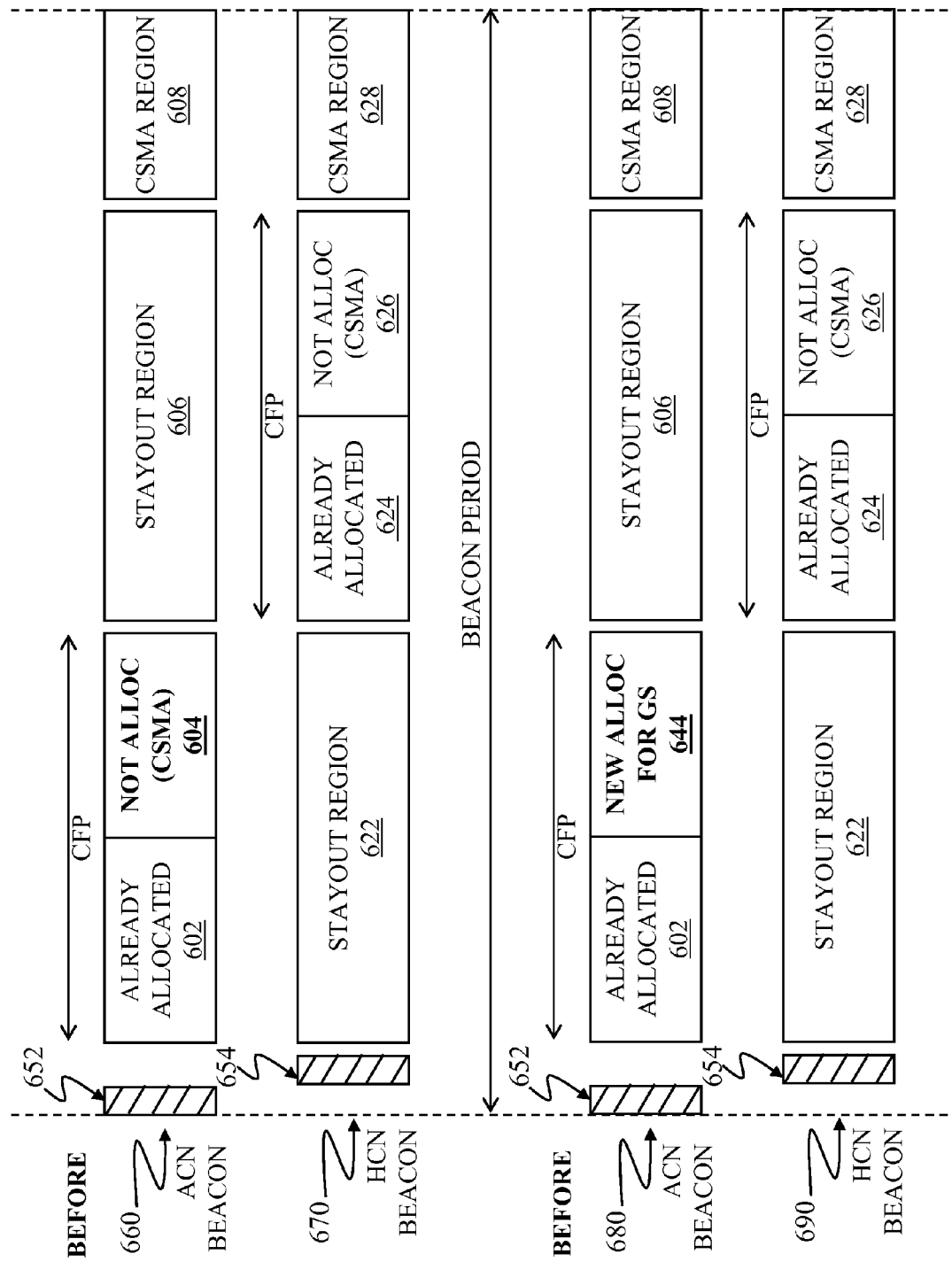
FIG. 6 shows exemplary beacon schedules before and after allocation of additional resource to the gateway station by the access CCO, according to an embodiment of the invention.

FIG. 6 shows exemplary ACN and HCN beacons prior to 660, 670 and after 680, 690 the access CCO allocates resource to the GS. The ACN beacon 660, prior to allocation, for example, has three regions—a CFP period 602, 604, a stayout region 606, and a CSMA region 608. Each CCO transmits its own beacon at a beacon slot, for example, the first beacon slot 652 for the access CCO and the second beacon slot 654 for the home CCO. A portion of the CFP region 602 is particularly allocated for certain device(s) controlled by the access CCO, while another portion 604 is currently unallocated and thus may be used typically by stations/devices under the control of the access CCO using CSMA. Other neighbor network CCOs, however, are typically aware that this unallocated CFP region 604 is a CFP allocation for the access CCO and thus to be compatible, the neighbor CCOs assigns a stayout region 622 in the corresponding time interval.

The HCN beacon 670, on the other hand, to be compatible in the coordinated operating mode may have three corresponding regions—stayout region 622, a CFP period 624, 626, and a CSMA region 628, in the same corresponding time slots or intervals. Note, for example, the beacons 660, 670 are set-up such that a CFP in the ACN 602, 604 corresponds to a stayout region 622 in the HCN. The CFP 624, 626 of the HCN 670 has an allocated CFP portion 624 and an unallocated portion 626 that is currently set to CSMA for use by devices/stations controlled by the home CCO. To be compatible, the CSMA region 608 of the ACN corresponds to a matching CSMA 628 of the HCN.

The two exemplary beacons 680, 690 below show exemplary embodiments of the ACN beacon and the HCN beacon after resource allocation by the access CCO. In this embodiment, the access CCO assigns a previously unallocated CFP time interval 604—prior to granting of request—to the GS 644. In general, the HCN beacon 690 is typically unchanged, because the corresponding time interval 622 for the HCN remains as a stayout region 622.

Using Resource from the Home Centralized Network

Figure 7:
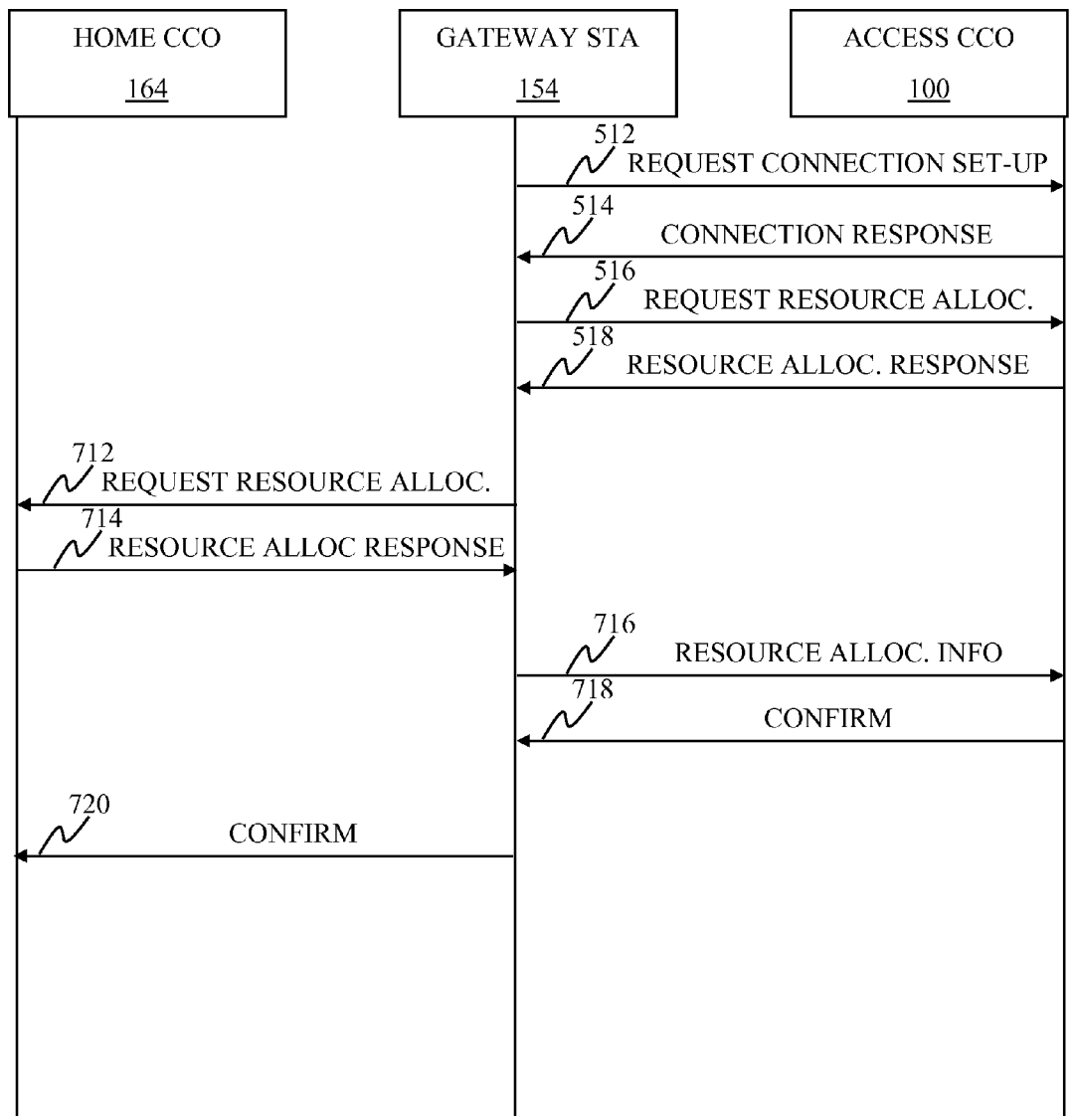
FIG. 7 is an exemplary diagram illustrating messages exchanged between a gateway station, an access CCO, and a home CCO when a gateway station requests resources from the access CCO and the home CCO, according to an embodiment of the invention.

FIG. 7 is an exemplary message exchange diagram showing how exemplary messages are exchanged between a GS 154, an access CCO, 100, and a home CCO 164. This exemplary exchange scenario typically occurs after the GS is unavailable to obtain BW from the access CCO. The GS in this example typically registers that it is a member of an ACN and HCN. Upon recognizing that the GS is itself a member of the HCN, the GS then transmits a similar BW request to its home CCO, if the access CCO is unable to grant the request for BW by the GS. This request may also contain similar information as those sent by the GS when requesting resource from the access CCO.

The first four messages 512, 514, 516, 518 are similar to those in FIG. 5—showing the GS requesting resources from the access CCO. The access CCO, however, responds 518 back informing the GS that it is unable to grant the resource allocation request. This response 518, in some embodiments, includes an instruction to the GS to request resources from the home CCO. In some embodiments, the GS is automatically aware that once resource is unavailable from the access CCO, the GS is to send a similar allocation request to the home CCO.

The GS thus requests BW allocation from the home CCO 712. The home CCO determines if it has unallocated CFP time interval to allocate to the GS 714. Based on this determination, the home CCO accordingly sends a resource allocation response 714 to the GS informing the GS that is able or unable to grant that request. If the home CCO is able to allocate the resource to the GS, the resource allocation response may include a result code and other resource-allocated related information. In some embodiments, a global ID link (GLID) information is included as part of the response 714, informing the GS the allocated time interval and duration. If the home CCO 164, however, is unable to allocate resource to the GS, the home CCO sends a message 714 to the GS indicating that resource may not be allocated. The GS 154 then informs the access CCO 100 whether the request for resource from the home CCO has been granted or not 716, including other resource-allocation information. This resource-allocation unavailability information is typically then registered by the access CCO 100. Such information may be registered, for example, via a data base or configuration fields maintained by the access CCO. This receipt of this information 716 may also be confirmed or acknowledged by the access CCO 718. Optionally, the GS also confirms or sends another message to the home CCO 720 informing the home CCO, for example, that a resource allocation allocated is going to be made, other acknowledgment information, and that receipt of the resource has been transmitted to the access CCO.

Figure 8:
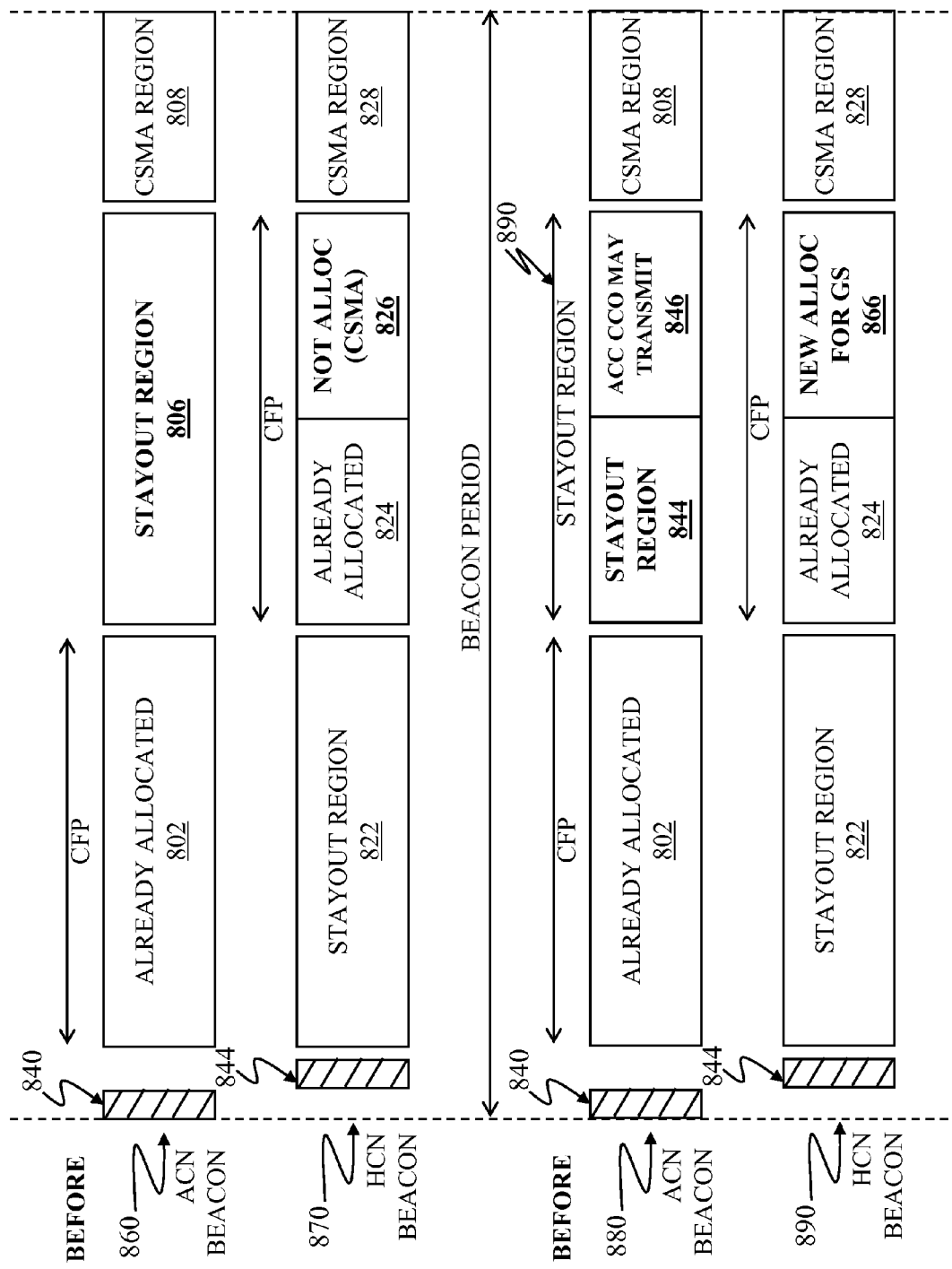
FIG. 8 shows exemplary beacon schedules before and after allocation of additional resource to the gateway station by the home CCO, according to an embodiment of the invention.

FIG. 8 shows exemplary beacons prior to 860, 870 and after allocation 880, 890 of resource to the GS by the home CCO. The top ACN 860 and HCN 870 beacons show that prior to allocation, the ACN has a fully allocated CFP region 802, a stayout region 806, and a CSMA region 808, while the HCN has a compatible stayout region 822, a CFP region 824, 826, and a CSMA region 828 in the corresponding time slots. The CFP of the HCN has an allocated 824 portion indicating that these time intervals have been allocated to particular stations controlled by the HCN. The unallocated portion in the CFP is for use by the stations controlled by the HCN, however, this portion is not definitely allocated for particular stations, thus stations in the HCN contend for resource using CSMA 826. The access CCO broadcasts its beacon at the first beacon slot 840, while the home CCO transmits its beacon at the second beacon slot 844.

After the home CCO allocates resource to the GS, the home accordingly updates its beacon or other CCO information to register the allocation to the GS. The home CCO 890 in some embodiments allocates the previously unallocated CFP or portions thereof 826 to the GS 866 as shown in the bottom HCN beacon 890. Furthermore, a portion of the ACN 880 stayout region 846 is modified so that the access CCO may transmit at that time interval 846 matching or aligning with the interval allocated 866 by the home CCO. The other previously allocated CFP 824 is typically not modified, thus the stayout region 844 at that time interval is left unchanged. In some embodiments, the GS also sends information, via a broadcast or direct transmission, e.g., of the time interval allocated so that access CCO knows that it may now use that allocated time interval for its transmission. Alternatively or in addition, a broadcast of these modified beacons containing new allocation information may also be performed.

Typically, the CFP time interval secured 866 by the GS from its home CCO is typically still indicated as a stayout region 890 in the part of the ACN, i.e., the access CCO continues to specify the allocated time interval as a stayout region 846, 890 in its beacon schedule. The home CCO, on the other hand, continues to specify the allocated time interval 866 in the CFP as a CFP period in its beacon schedule. The access CCO, however, aware that the GS has obtained the allocated time interval, interprets that time interval 846 as a duration wherein the GS, the access CCO, or alternatively other stations controlled by the access CCO is allowed to transmit, thereby using the resource of the home CCO.

Using Neighbor Network Coordination to Obtain Resource

Figure 9:
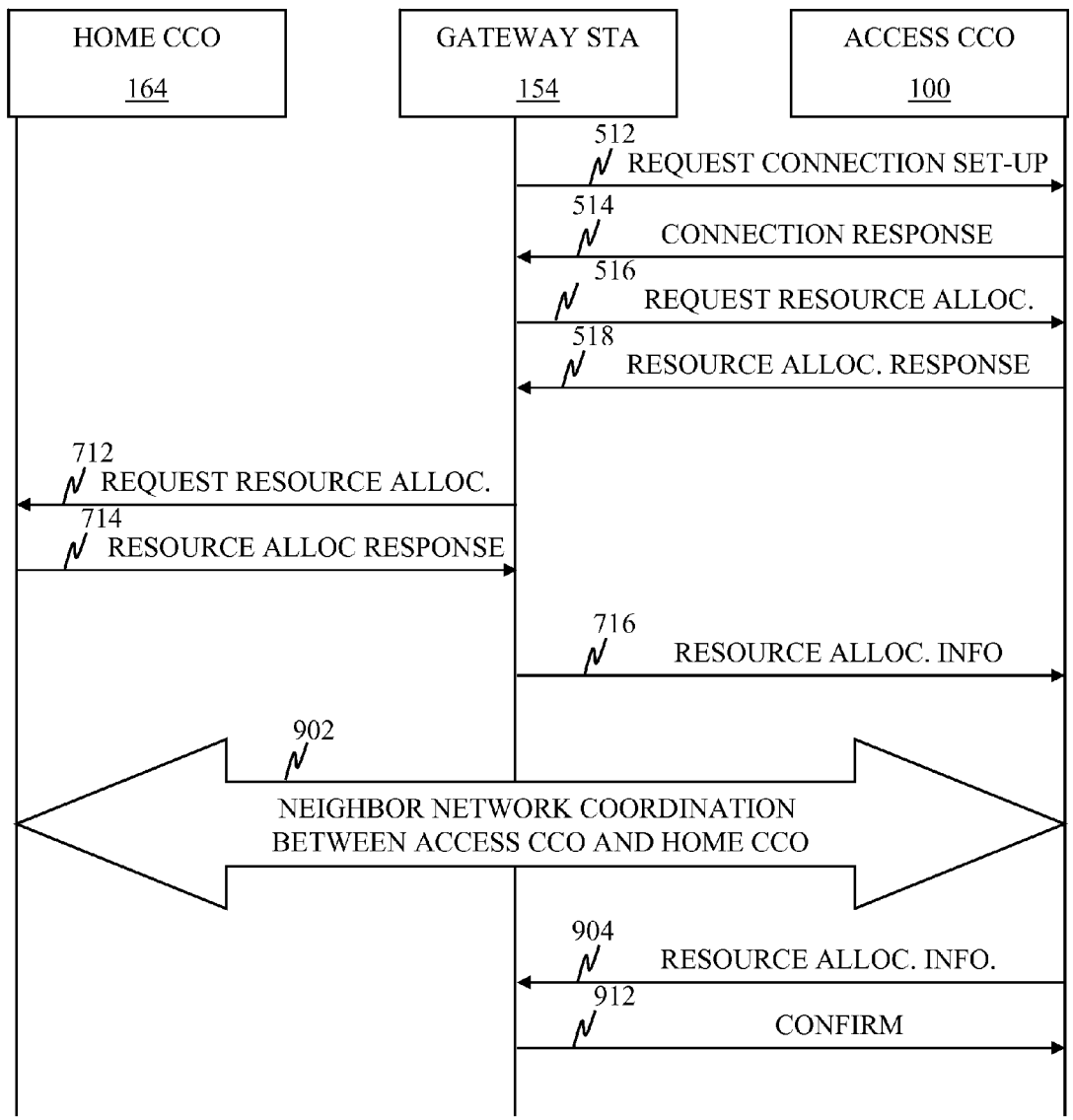
FIG. 9 is an exemplary diagram illustrating messages exchanged between a gateway station, an access CCO, and a home CCO, according to an embodiment of the invention.

FIG. 9 is an exemplary signal exchange diagram showing how exemplary messages are exchanged between a GS 154, an access CCO, 100, and a home CCO 164. This scenario typically occurs after the GS is unavailable to obtain BW from the access CCO and the home CCO. The first series of messages 512, 514, 516, 518, 712, 714, 716 is similar to those at discussed in FIG. 7. The messages exchanged, however, indicate that access CCO and the home CCO are not able to provide the available resource as requested by the GS.

After receiving the message 716 that the home CCO is unable to provide resources, the access CCO 100 typically initiates the neighbor network coordination protocol to increase its share of the resource 902. In some embodiments, the home CCO initiates the neighbor network coordination protocol, to obtain additional BW to be allocated to the GS. If resource is made available via the network neighbor coordination protocol, such available resource is then allocated to the GS. The access CCO 100 typically then sends a message 904 to the GS 174 informing the GS whether additional resource is obtained for the GS. The GS may optionally confirm the receipt of information 912 or send a message requesting resource with a different CSPEC.

Figure 10:
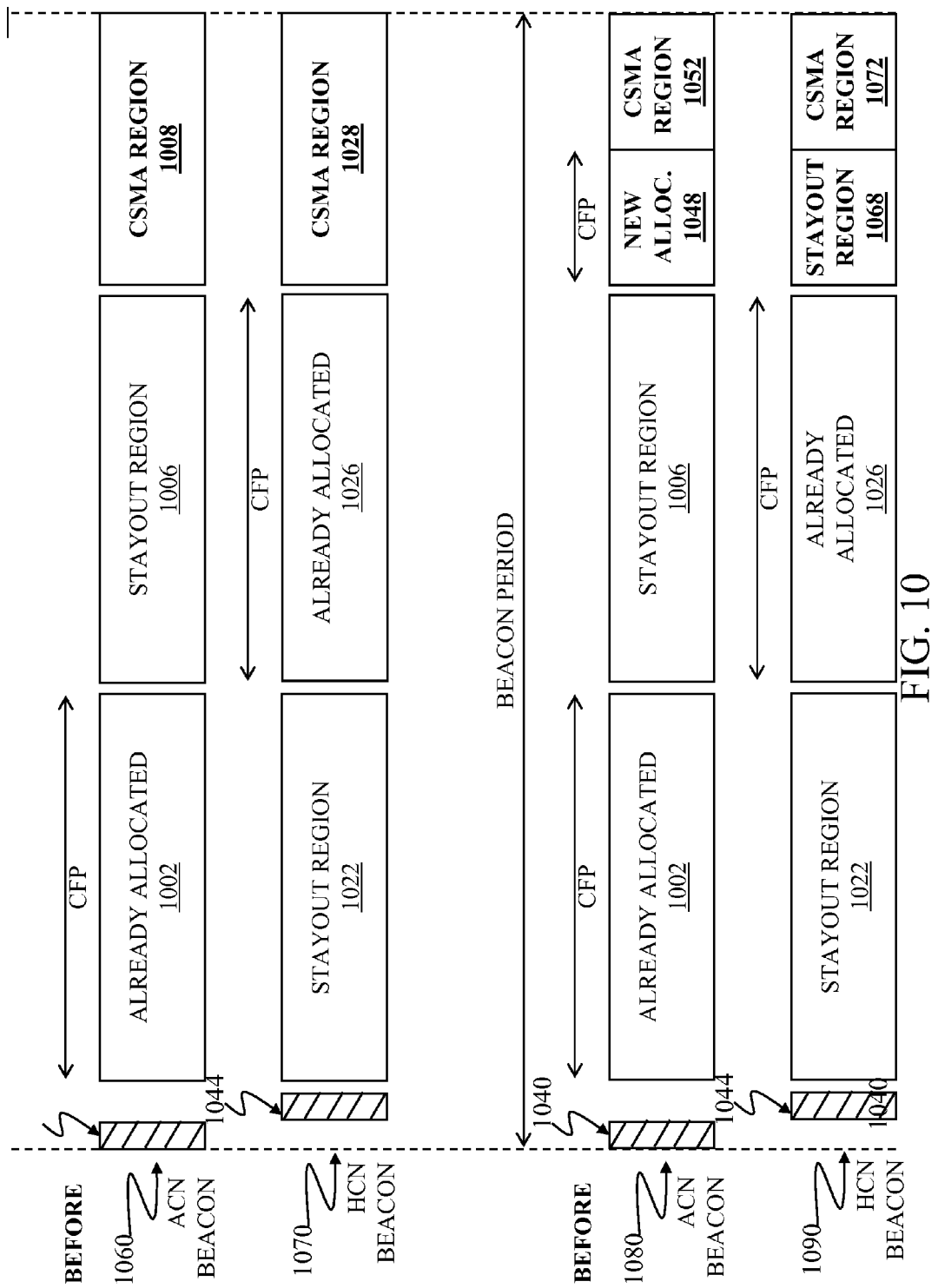
FIG. 10 shows exemplary beacon schedules before and after allocation of additional resource as a result of neighbor network coordination, according to an embodiment of the invention.

FIG. 10 shows the ACN and HCN beacons before 1060, 1070 and after resource allocation 1080, 1090, as a result of performing the neighbor network coordination protocol. In some embodiments, performing the neighbor network coordination protocol may result in not having obtained an additional resource allocation. The ACN beacon 1060 shows an allocated CFP 1002, a stayout region 1006, and a CSMA region 1008, while the HCN beacon 1070 shows a corresponding compatible stayout region 1022, a CFP 1026, and a CSMA region 1028. After allocation, the ACN beacon 1080 shows that the CSMA region 1008 has been modified to have a new CFP portion 1048 allocated to the GS and a remaining CSMA region 1052. Matching that time interval, the HCN beacon 1090 has a matching stayout region 1068—matching the new CFP portion 1048, and a remaining CSMA region 1072. The new CFP allocation 1048 may thus be used by the GS 154, the access CCO 100, or by other devices controlled by the access CCO 100 to transmit. Typically, this allocation is for the GS or the access CCO to use. The resources obtained in response to the request for additional resources by the GS, either provided by the access CCO, home CCO, or via neighbor network coordination, may in some embodiments be used by the GS, the access CCO or other devices controlled by the access CCO to transmit data, for example, over the data communication system 101.

Neighbor Network Coordination Protocol (Sharing Bandwidth in Coordinated Mode)

Figure 11:
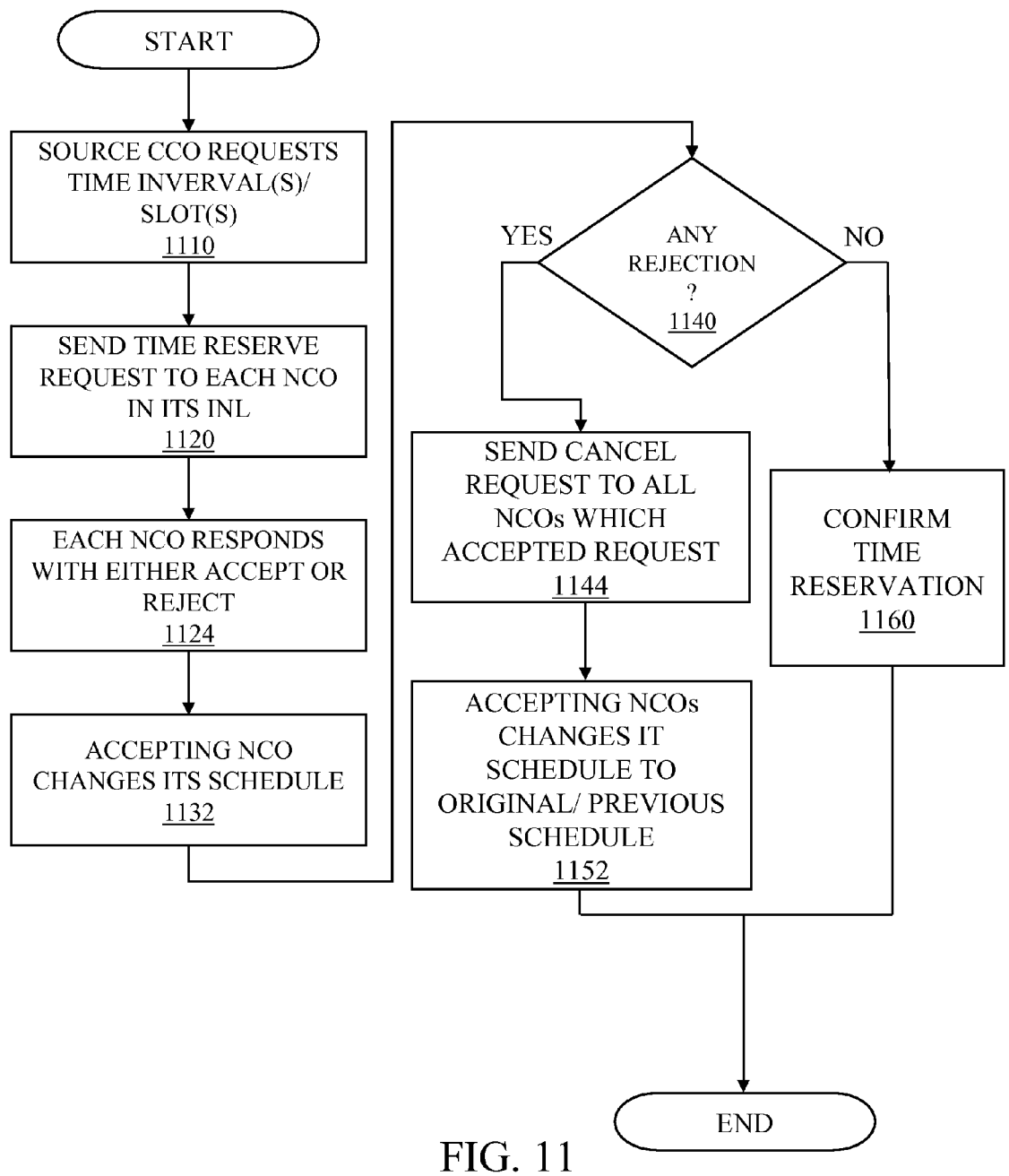
FIG. 11 is a high-level exemplary flowchart showing a process by which how a CCO may request additional resources using neighbor network coordination protocol, according to an embodiment of the invention.

FIG. 11 is a high level flowchart showing an embodiment of an exemplary process by which a neighbor network coordination protocol is performed to share bandwidth between CCOs, particularly between neighbor networks operating in the coordinated mode. In this example, a source CCO, e.g., an access CCO, initially determines one or more new time intervals that it desires to reserve, i.e., to reserve as a reserved region or CFP region (step 1110). In an exemplary embodiment, this time interval may be based on the allocation request sent by a GS to the access CCO. In general, the source CCO derives or selects a schedule compatible with its other neighbor networks in its INL. The source CCO then sends a message/request to each of its neighbor networks in its INL indicating the requested additional time interval(s). In some embodiments, the schedule for each requested interval is specified by a start time and an end time, typically using the start time of the sender's beacon region as a reference (step 1120). Each of the neighbor networks in general, particularly its CCO, responds to that request by either accepting or rejecting that request (step 1124). If the neighbor network accepts that request, the neighbor central coordinator (NCO) typically changes its one or more regions to reflect the changes in its schedule (step 1132). Such change may, for example, include changing one or more time slots to a stayout period. If the neighbor network rejects that request, the neighbor network notifies the source CCO, typically with an unsuccessful result code, i.e., a rejection (step 1124).

When the source CCO receives the response from all of its neighbor networks (NCOs) in its INL, it generally determines whether any rejection responses have been received. If all the NCOs accepted the requested time interval (decision 1140), the CCO updates a status field message, e.g., with a "Go," and sends out a confirming message to all of its neighbor networks in its INL and confirms that the source CCO is going to reserve the requested time interval (step 1160). On the other hand, if any one of the NCOs rejected the request, (decision 1140), the source CCO updates the status field to a "Cancel," informs the NCOs that the request has been cancelled or withdrawn. In some embodiments, the CCO typically sends this "Cancel" message only to those NCOs that have previously replied with successful result code or acceptance of the request. Upon receiving the "Cancel" message, NCOs, particularly those that previously changed their regions, reset their schedules to their original values (step 1152).

Releasing Bandwidth

A CCO that wishes to release one or more reserved time intervals, e.g., one or more time slots in one or more reserved regions, typically sends a release reserved time interval message to each neighbor CCO in its INL. This release message typically contains the schedules to be released. The schedule is typically specified by a start and end time, for example, using the CCOs beacon region as a reference. Each CCO that receives this request typically sends a response back, e.g., a response indicating success or failure. If a response indicating "success" is received, this means that the requesting CCO may change its previously indicated reserved region to CSMA, for example, while the CCO in the INL may change its previously stayout region to also CSMA.

Figure 12:
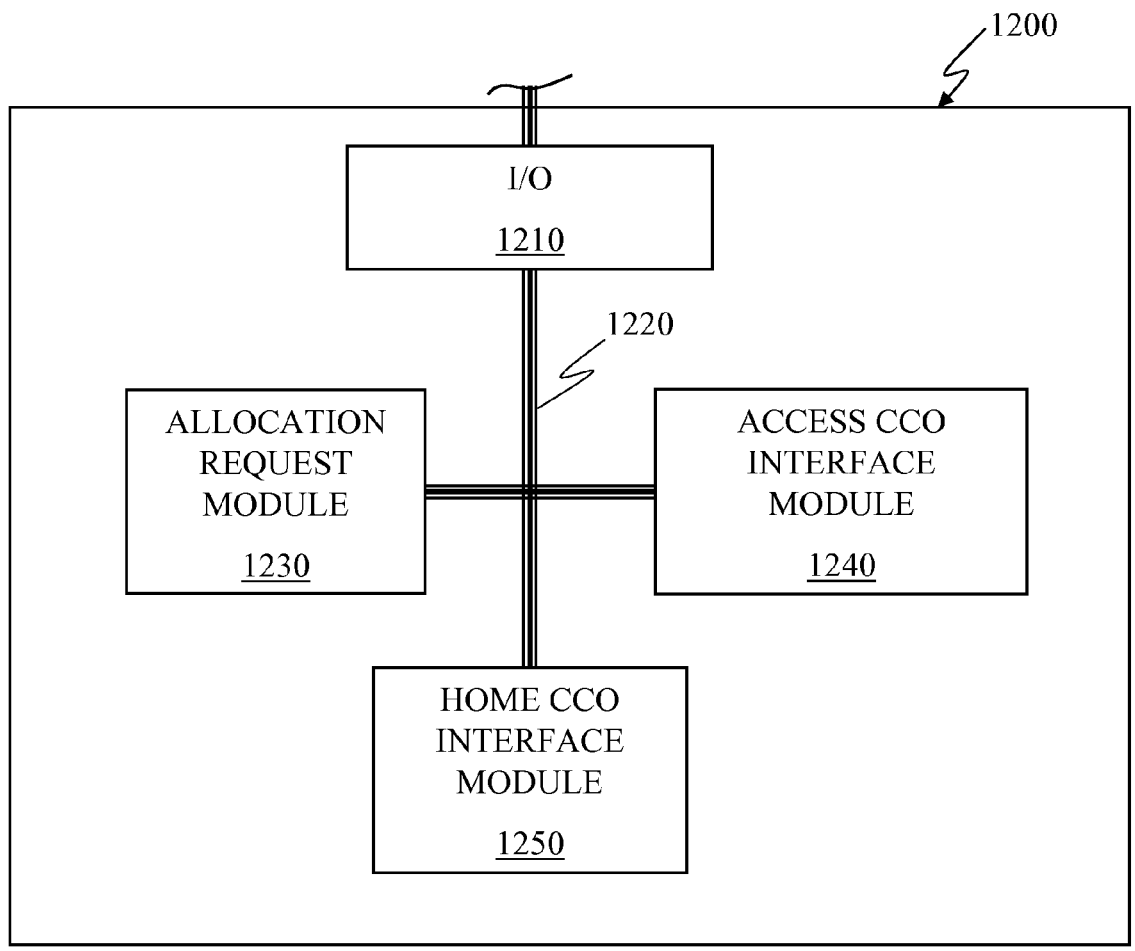
FIG. 12 is a high-level functional block diagram of an exemplary gateway station, according to an embodiment of the invention.

FIG. 12 is a high-level block diagram of an exemplary gateway station 1200 according to some embodiments of the invention. In some embodiments, an input/output (I/O) interface 1210 couples the GS 1200 to the network, enabling communication with other devices in the network, particularly with the access CCO and a home CCO. In some embodiments, a GS also includes a request allocation module 1230, which performs the functions and logic of obtaining resource from the access CCO and the home CCO. The access CCO interface module 1240 performs the functions and logic enabling the GS to interface and communicate with an access CCO, for example, exchanging messages with the access CCO. The home CCO interface module 1250 performs the functions and logic enabling the GS to interface and communicate with the home CCO, for example, exchanging messages with the home CCO. In some embodiments, the different modules may communicate and interface with each other via a bus, dedicated signal paths or one or more channels 920.

Figure 13:
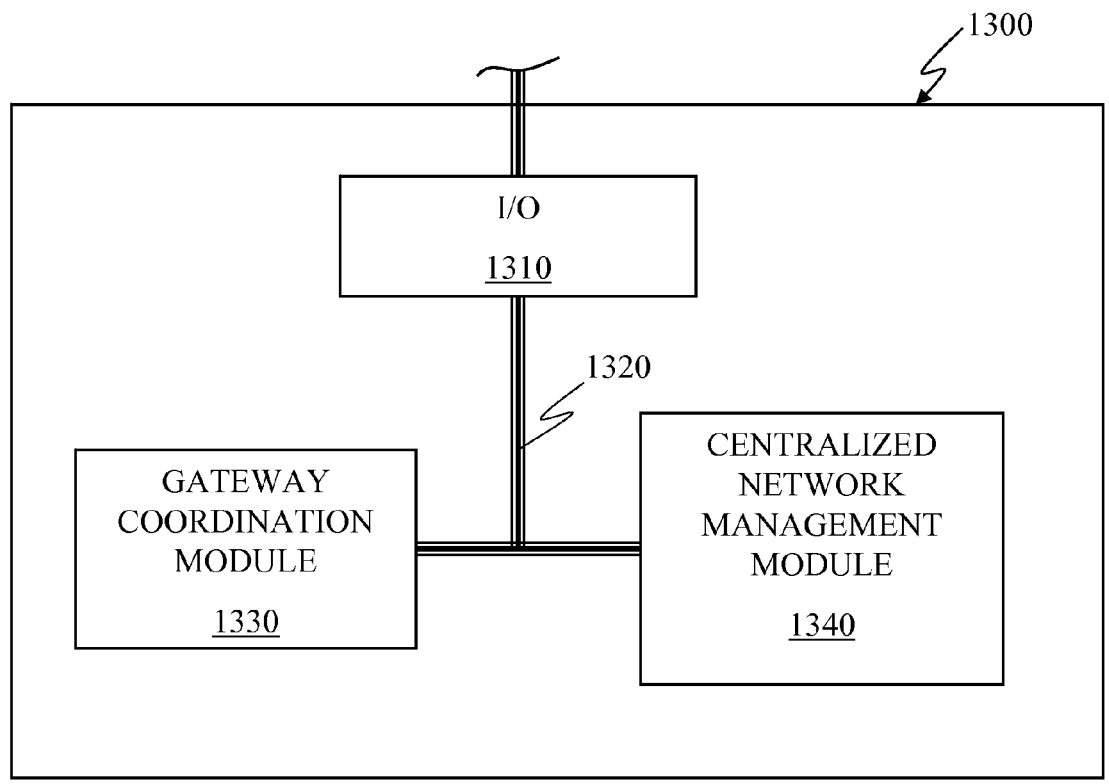
FIG. 13 is a high-level functional block diagram of an exemplary central coordinator, according to an embodiment of the invention.

FIG. 13 is a high-level block diagram of an exemplary central coordinator 1300, e.g., an access CCO or a home CCO, according to some embodiments of the invention. In some embodiments, an I/O interface 1310 couples the CCO 1300 to the network, enabling communication with other devices in the network. In some embodiments, a CCO also includes a gateway coordination module 1330, which performs the operations for responding to a gateway's request for additional resource, such as determining if resource is available, including transmitting allocation information to the gateway. The home CCO 1300 also includes a centralized network management module 1340 that performs the functions of controlling and managing the activities of a home centralized network, including sending beacons and performing neighbor network coordination protocol functions. In some embodiments, the different modules may communicate and interface with each other via a bus, dedicated signal paths or one or more channels 1320. One of ordinary skill in the art will appreciate that the components of the gateway and the CCO, as described above, may be varied and still be in accordance with the embodiments of the invention. For example, the various modules may be further subdivided into more granular modules as well as have all the modules be integrated into just one module.

Embodiments of the present invention may be used in conjunction with networks that comply with standards or other power line communication standards. Although this invention has been disclosed in the context of certain embodiments and examples, it will be understood by those or ordinary skill in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of ordinary skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

We claim:

1. A method of sharing resource in a data communication system, the system including a first centralized network (FCN), a second centralized network (SCN), and a gateway, the FCN including a first central coordinator (CC0) managing the activities of the FCN and the gateway, and the SCN including a second CC0 managing the activities of the SCN and the gateway, the method comprising steps of:

requesting, by the gateway, resource allocation from the first CCO;

determining, by the first CCO, availability of at least one first CCO contention-free-period (CFP) time slot;

if the at least one first CCO CFP time slot is available: allocating to the gateway, by the first CCO, the at least one first CCO CFP time slot; and transmitting by the first CCO allocation information to the gateway related to the allocated at least one first CCO CFP time slot; and if the at least one first CCO CFP time slot is unavailable: transmitting by the first CCO allocation unavailability information to the gateway;

requesting, by the gateway, resource allocation from the second CCO; determining, by the second CCO, availability of at least one second CCO CFP time slot; if the at least one second CCO CFP time slot is available: allocating to the gateway, by the second CCO, the at least one second CCO CFP time slot; and transmitting by the second CCO allocation information to the gateway related to the allocated at least one second CCO CFP time slot; and if the at least one second COO CFP time slot is unavailable: transmitting, by the second CCO, allocation unavailability information to the gateway; and performing a neighbor network coordination protocol to obtain additional resource for the gateway.

2. The method of claim 1, further comprising the step of transmitting data by the gateway at the allocated at least one first CCO time slot when the at least one first CCO time slot is available.

3. The method of claim 1, further comprising the step of transmitting data by the gateway at the allocated at least one second CCO time slot when the at least one second CCO time slot is available.

4. The method of claim 1, further comprising the step of transmitting by the gateway to the first CCO the allocation information related to the allocated at least one second CCO CFP time slot.

5. The method of claim 4, further comprising the step of registering by the first CCO the allocation to the gateway of the at least one second CCO CFP time slot in a stayout region of the first CCO.

6. The method of claim 5, further comprising the step of scheduling transmission by the access CCO at the allocated at least one second CCO time slot.

7. The method of claim 1 wherein the performing the neighbor coordination protocol is initiated by at least one of the following: the access CCO and the home CCO.

8. The method of claim 1 wherein the step of performing the neighbor coordination protocol results to a resource allocation to the gateway.

9. The method of claim 1 wherein the data communication system is a power line communication system.

10. The method of claim 1 wherein the step of performing the neighbor coordination protocol further comprises modifying a beacon schedule of the first CCO and a beacon schedule of the second CCO.

11. A system having a common communication medium, the system comprising:

an access centralized network (ACN) operably coupled to a data communication network, the ACN comprising an access central coordinator (CCO) managing network activities of the ACN and a gateway;

a home centralized network (HCN) operably coupled to the gateway, the HCN comprising a home CCO managing network activities of the HCN and the gateway; and the gateway operably coupled to both the access CCO and the home CCO, the gateway configured to;

request resource from the access CCO; and request resource from the home CCO; wherein the access CCO and the home CCO are each configured to perform a neighbor network coordination protocol to share resources over the common communication medium; and wherein the access CCO is configured to schedule transmission at a stayout region time slot of the access CCO and wherein the stayout region time slot has been registered by the access CCO to be allocated to the gateway by the home CCO.

12. The system of claim 11 wherein the common communication medium is a power line communication medium.

13. The system of claim 11 wherein the data communication network is the Internet.

14. The system of claim 11 wherein the access CCO is further configured to schedule transmission by the gateway at the stayout region time slot of the access CCO.

* * * * *